United States Patent
Naumann

(10) Patent No.: US 12,528,235 B2
(45) Date of Patent: Jan. 20, 2026

(54) ROTATIONAL MOLDING APPARATUS AND METHOD FOR OPERATING A ROTATIONAL MOLDING APPARATUS

(71) Applicant: ROTO EVOLUTION GMBH, Crimmitschau (DE)

(72) Inventor: Frank Naumann, Crimmitschau (DE)

(73) Assignee: Roto Evolution GmbH, Crimmitschau (DE)

( * ) Notice: Subject to any disclaimer, the term of this patent is extended or adjusted under 35 U.S.C. 154(b) by 101 days.

(21) Appl. No.: 18/011,169

(22) PCT Filed: Jun. 16, 2021

(86) PCT No.: PCT/EP2021/066202
§ 371 (c)(1),
(2) Date: Dec. 17, 2022

(87) PCT Pub. No.: WO2021/255074
PCT Pub. Date: Dec. 23, 2021

(65) Prior Publication Data
US 2023/0241809 A1 Aug. 3, 2023

(30) Foreign Application Priority Data

Jun. 19, 2020 (LU) .................................... 101868
Jun. 19, 2020 (LU) .................................... 101869

(51) Int. Cl.
*B29C 41/06* (2006.01)
*B29C 41/52* (2006.01)

(52) U.S. Cl.
CPC .............. *B29C 41/06* (2013.01); *B29C 41/52* (2013.01)

(58) Field of Classification Search
CPC ......... B29C 41/06; B29C 41/52; B29C 41/04; B29C 41/34; B29C 33/30; G06F 30/12;
(Continued)

(56) References Cited

U.S. PATENT DOCUMENTS 3,677,670 A 7/1972 Mori et al.
3,704,084 A 11/1972 Clay
(Continued)

FOREIGN PATENT DOCUMENTS

CN 100439064 C 12/2008
CN 206825773 U 1/2018
(Continued)

OTHER PUBLICATIONS

Harris, Cyril M., Ed., Dictionary of Architecture & Construction, Fourth Edition, McGraw-Hill 2006, p. 434.

*Primary Examiner* — Galen H Hauth
*Assistant Examiner* — Baileigh Kate Darnell
(74) *Attorney, Agent, or Firm* — Hodgson Russ LLP

(57) ABSTRACT

The invention relates to a method for operating a rotational molding apparatus that comprises a rotatably mounted rotational-molding mold holder having a rotational-molding mold. The method is characterised in that a trajectory of a reference point of a component for a rotation process, in particular a component of the rotational-molding mold holder or the rotational-molding mold, which component rotates during a rotation process, is selected from one of a plurality of possible trajectories that can be achieved by the rotational molding apparatus, and in that a rotation process is subsequently performed in which rotational-molding material introduced into the rotational-molding mold accumulates on the inner face of the rotational-molding mold and in which the reference point moves along the determined trajectory.

46 Claims, 11 Drawing Sheets

Figure 1:
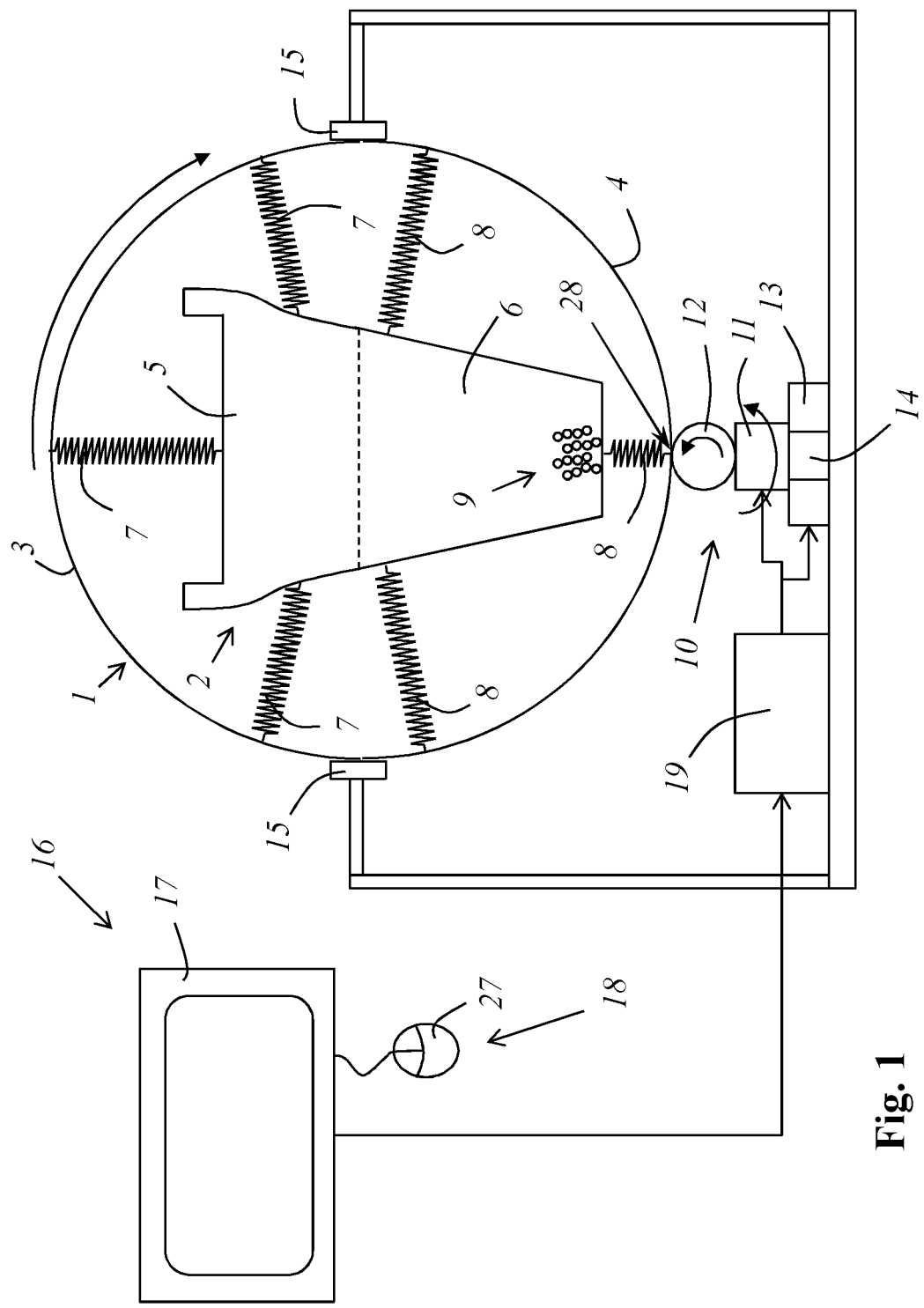

(58) Field of Classification Search
CPC ...... G06F 30/17; G06F 30/20; G06F 2111/06; G06F 2111/20; G06F 2113/22; G06F 2119/18; G02B 30/00; G02B 30/22; G02B 30/24; G02B 30/40; G02B 30/50; G02B 30/52; G02B 30/54; G02B 30/56; B28B 1/20; B28B 1/28
See application file for complete search history.

(56) References Cited

U.S. PATENT DOCUMENTS

| | | | |
|---|---|---|---|
| 4,690,626 A | 9/1987 | Krzepinski | |
| 4,939,635 A * | 7/1990 | Seki | G05B 19/40933 700/86 |
| 6,036,897 A | 3/2000 | Nugent | |
| 6,162,042 A | 12/2000 | Reinhardt | |
| 6,511,619 B1 * | 1/2003 | Payne | E04C 2/205 264/40.1 |
| 8,159,494 B2 * | 4/2012 | Lee | G06T 11/20 345/442 |
| 2002/0051834 A1 | 5/2002 | Bauer | |
| 2011/0218776 A1 * | 9/2011 | Shono | G06F 30/20 703/1 |
| 2015/0118341 A1 | 4/2015 | Kuijt et al. | |
| 2016/0039114 A1 | 2/2016 | Naumann | |
| 2018/0126606 A1 | 5/2018 | Naumann | |
| 2020/0207024 A1 * | 7/2020 | Morris | B29C 70/38 |
| 2021/0354341 A1 | 11/2021 | Potargent | |
| 2022/0155752 A1 * | 5/2022 | Søndergaard | G06F 30/00 |

FOREIGN PATENT DOCUMENTS

| | | |
|---|---|---|
| DE | 19831271 A1 | 1/2000 |
| DE | 102012217763 A1 | 4/2014 |
| EP | 0451077 A1 | 10/1991 |
| EP | 2918386 A1 | 9/2015 |
| ES | 2190709 A1 | 8/2003 |
| LU | 100802 B1 | 11/2019 |
| WO | 99/56929 A1 | 11/1999 |

* cited by examiner

ROTATIONAL MOLDING APPARATUS AND METHOD FOR OPERATING A ROTATIONAL MOLDING APPARATUS

CROSS-REFERENCE TO RELATED APPLICATIONS

The present application is the U.S. national phase of International Application No. PCT/EP2021/066202 filed Jun. 16, 2021, which claims priority of Luxembourg Application No. 101868 filed Jun. 19, 2020 and Luxembourg Application No. 101869 filed Jun. 19, 2020, the entire disclosures of which are incorporated herein by reference.

FIELD

The disclosure relates to a method for operating a rotational-molding device, which comprises a rotatably mounted rotational-mold holder with a rotational mold.

The disclosure moreover relates to a rotational-molding device, which comprises a rotatably mounted rotational-mold holder with a rotational mold.

BACKGROUND

In order to be able to produce rotational moldings from plastics materials, it is necessary to rotate a rotational mold charged with rotational-molding material and in the process to heat it to such a high temperature that the usually pulverulent or granular, in particular microgranular, rotational-molding material melts during the rotation process and accumulates on the inner wall of the mold. The rotational movement must not take place only about a single axis of rotation here; rather, it is necessary to rotate the rotational-molding material in at least two dimensions.

U.S. Pat. No. 6,555,037 B1 discloses a multi-axis rotational device which comprises a carrier part with drive wheels and a spherical frame part, which contains a mold. The spherical frame part has pairs of circular notches in which the drive wheels can engage.

WO 2014/000 724 A1 discloses a rotational device for rotational moldings, which comprises a spherical receiving device for at least one mold, a holding device for the spherical receiving device, and a drive unit for bringing about the rotational movement. The spherical receiving device consists of two parts and can be opened in a parting plane in order to charge the mold or in order to be able to remove the finished rotational molding from the mold. The spherical receiving device is driven in rotation by means of a motor-driven drive wheel rolling on the outer side.

EP 3 318 382 A1 discloses a spherical receiving device for receiving at least one rotational mold, which is designed and intended to be driven in rotation in a rotational device by means of a drive wheel rolling on the outer side of the spherical receiving device, wherein the receiving device has at least one guide device which has the effect that a drive wheel rolling on the outer side of the spherical receiving device follows a predetermined rolling path on the outer side of the spherical receiving device. In addition to a curvature resulting from the spherical shape of the receiving device, the rolling path has a further curvature.

SUMMARY

It is an object of the present disclosure to specify a method which enables efficient production of rotational-molding products.

The object is achieved by a method of the type mentioned in the introduction which is characterized in that a trajectory of a reference point on a component, in particular the rotational-mold holder or the rotational mold, rotating in the course of a rotation operation is selected for a rotation operation from one of multiple possible trajectories that can be performed by the rotational-molding device, and in that then a rotation operation is performed, during which rotational-molding material introduced into the rotational mold accumulates on the inner side of the rotational mold and during which the reference point moves along the established trajectory.

Another object of the present disclosure is to specify a rotational-molding device which enables efficient production of rotational-molding products.

The object is achieved by a rotational-molding device which is characterized in that a trajectory of a reference point on a component, in particular the rotational-mold holder or the rotational mold, rotating in the course of a rotation operation can be selected for a rotation operation from one of multiple possible trajectories that can be performed by the rotational-molding device, and in that, after a selection operation, a control device controls a rotation operation during which rotational-molding material introduced into the rotational mold accumulates on the inner side of the rotational mold in such a way that the reference point moves along a selected trajectory.

The disclosure has the very particular advantage of being able to produce rotational-molding products more quickly by selecting a trajectory individually matched to the respective product to be produced. For example, the trajectory may be selected such that at least one location on the inner side of the rotational mold remains free of rotational-molding material during the rotation operation. This can be achieved in particular in that the location to be kept free is never arranged at the bottom during the rotation operation, in the course of which the reference point moves along the trajectory. For example, in the case of the production of a plant pot, this can advantageously be achieved in that the upper opening remains free already during the rotational-molding operation, whereas, in the course of the rotational-molding production method that was routine up to now, it was necessary to cut free the upper opening with a knife in a separate work step after the rotational-molding operation. In this respect, according to the disclosure, in such a case a saving is made on time and rotational-molding material.

As an alternative or in addition, the trajectory according to the disclosure may be selected such that, during the rotation operation, an especially large amount of rotational-molding material accumulates at least at one location on the inner side of the rotational mold. This can be achieved, for example, in that the location on the inner side of the rotational mold is arranged at the bottom more often than all other locations on the inner side of the rotational mold during the rotation operation, in the course of which the reference point moves along the trajectory. For example, in this way the bottom region of a plant pot to be produced can be formed as particularly thick and thus particularly stable, while for example the side wall can be formed as thinner. In this way, a saving can be made in particular on rotational-molding material.

The selected trajectory is the path along which the reference point moves during the rotation operation, in particular from the beginning of the rotation operation to the end of a heating period, during which the rotating rotational mold is heated, or to the end of a cooling operation, in the course of which the rotating rotational mold is cooled, in particular by active or passive cooling.

The disclosure makes it possible in particular to save on rotational-molding material, because locations on the inner side of the rotational mold can be selectively kept free and/or locations can be selectively formed as thinner than others, for example when only a low degree of stability is necessary there.

The disclosure even makes it possible to produce articles which could be produced only with difficulty or not at all in a rotational-molding method up to now. For example, according to the disclosure, it is also possible to use a rotational mold which has a narrow, outwardly directed blind hole, in order that the product to be produced has an outwardly directed tip at this location. The use of such a rotational mold would be very problematic when the conventional rotational-molding method is applied, because not enough of the rotational-molding material falls into the blind hole during continuous rotation. According to the disclosure, however, it is possible to select the trajectory such that the blind hole is aligned downward particularly often and that the rotational speed is reduced (optionally even to zero) whenever the blind hole is located at the bottom. This has the effect that the rotational-molding material has enough time to enter the blind hole. In this respect, according to the disclosure, allowance can be made in particular for the circumstance in which the granular rotational-molding material does not behave like a liquid within the rotational mold during a rotation operation. Rather, some of the granular rotational-molding material that is predominantly at rest in the lower region relative to the rotational mold is always initially carried along within the rotational mold during the rotation operation without moving relative to the rotational mold, until at some point it begins to slip and comes to rest again at the bottom, with this operation continuing to repeat itself as rotation continues. In this respect, the granulate is not continuously distributed within the mold. Allowance can be made according to the disclosure for this circumstance, too, by selecting the respectively suitable trajectory.

In a particularly advantageous embodiment, the user can input at least one trajectory which can be performed by the rotational-molding device, in particular via an interface of the rotational-molding device, and add it to the multiple possible trajectories which can be performed by the rotational-molding device and from which a trajectory can be selected. For example, the rotational-molding device may comprise a USB interface or a data interface via which data characterizing a trajectory can be received.

In particular with a view to configuring the rotational-molding device as a spherical rotational device, it can be advantageously provided that the reference point is selected such that the trajectory runs exclusively on a spherical surface. In the case of a spherical rotational device, as for example that point on the outer side of the spherical rotational-molding holder that is right at the bottom (and optionally in contact with a drive wheel) at the beginning of the rotation operation can be selected as reference point. In terms of the selection of the reference point, however, there are no fundamental restrictions. Rather, in principle any point on the component which rotates during a rotation operation can be selected as reference point. The reference point may be a point on a component which rotates during a rotation operation that can be predetermined or that a user can establish, in particular the rotational-mold holder or the rotational mold. In particular, a reference point input device for inputting information characterizing the reference point may be present. For example, the user can establish the reference point by bringing the rotational mold into a rotating position in which the point to be established as reference point is arranged at a specific location in the space (for example right at the top or right at the bottom) and then communicating this to the rotational-molding device (for example by way of a keypress or a mouse click).

Using the example of a spherical rotational device, in the case of which that point on the outer side of the spherical rotational-mold holder that is right at the bottom and in contact with a drive wheel at the beginning of the rotation operation is selected as reference point, it is possible to particularly clearly illustratively explain how the reference point moves along the trajectory during a rotation operation by imagining that the drive wheel is the front wheel of a motorcycle, which travels along the trajectory on the outer side of the spherical rotational-mold holder. In this respect, symmetrical but also completely unsymmetrical trajectories can be traveled. For example, a short section of straight-ahead travel and then an elongate 270 degree right-hand curve can be joined to a narrow 90 degree left-hand curve.

In an advantageous embodiment of the rotational-molding device, the rotational-mold holder and/or the rotational mold remain stationary throughout the rotation operation and only perform the rotational movement in such a way that the reference point moves along the trajectory. Such an embodiment has the very particular advantage that the profile of the respective trajectory can be easily and quickly detected by the user. In particular, the selection of a trajectory suitable for the respective rotational mold currently to be used is particularly uncomplicated.

In a very particular embodiment, the control device rotates the rotational mold faster the higher a preselected or measured temperature of the rotational mold is. In this respect, however, it may be provided that individual trajectory segments are run through slower than other trajectory segments, it being possible for this to be predefined by the user. According to the disclosure, it was specifically identified that rotational molding which can be performed efficiently and quickly depends very particularly on the interaction of temperature and the movement behavior of the rotational-molding material within the rotational mold. For the movement behavior, the selection of the suitable trajectory and the selection of the variation of the rotational speed along the trajectory are particularly important.

In an advantageous embodiment, the selection of the trajectory includes the possibility for the user to select the shape and length of each section, provided that the rotational-molding device used is capable of performing the rotation correspondingly. In the case of a rotational-molding device in the form of a spherical rotational-molding device, in particular in the case of a spherical rotational-molding device in which the sphere remains stationary during the rotation operation, any desired trajectory can be selected, since such a rotational-molding device offers an infinite number of possible axes of rotation for the rotation of the sphere.

In a very particularly advantageous embodiment, the trajectory is established by inputting trajectory segments and joining together the trajectory segments that were input. Such a procedure enables the user to assemble a trajectory individually matched to the respective specific rotational mold that is to be used.

For example, an input device by means of which the trajectory segments can be input may be present. The input device may comprise a display device, which displays a selection display of different trajectory segment types from which trajectory segments can be selected by means of an input unit. The input device may comprise an input unit, for example in the form of a computer mouse or in the form of a touchscreen or in the form of a keyboard.

As an alternative or in addition, it may advantageously be provided that each trajectory segment is assigned a speed at which the reference point moves along the trajectory segment during a rotation operation. This can advantageously be achieved, for example, in that at some locations, at which the rotational movement is slower, a thicker layer of rotational-molding material accumulates than at locations at which the rotational movement is faster. It is for example also possible to slow down the rotational movement in order to have the effect that the rotating material can enter recesses, over which it would fall in the event of faster rotation. In particular, it may advantageously be provided that one or more trajectory segments are assigned not only a constant speed, but a speed variation over time, with which the reference point moves along the trajectory segment during a rotation operation. Such an embodiment is particularly precise in terms of the product to be produced.

The inputting of a trajectory segment can comprise the input of at least one parameter from the following group: trajectory segment length, trajectory segment curvature and trajectory segment curvature profile. In particular, it may be provided that the user selects a respective, already predefined trajectory segment type and matches it by establishing the spatial length and/or the curvature and/or the curvature profile.

In particular, it may advantageously be provided that trajectory segments directly following one another differ from one another in terms of the trajectory segment length and/or the trajectory segment curvature and/or the trajectory segment curvature profile and/or in terms of an assigned speed and/or an assigned speed variation. In this way, it is possible to realize trajectories individually adapted to the respective rotational mold. In particular, the trajectory may have an unsymmetrical form.

In a very particularly advantageous embodiment, a selection display of different trajectory segment types is displayed to the user, from which they can make an individual selection in succession in order to assemble the trajectory and select it in this way. In the selection display, the trajectory segment types may for example each be depicted in a perspective depiction. As an alternative or in addition, it is also possible that the trajectory segment types in the selection display are each depicted as a projection onto a planar surface. In particular, the projection may be a stereoscopic projection or a parallel projection or a Mercator projection. Such a projection increases clarity for the user and makes it easier to assemble the trajectory from trajectory segments.

The selection display may for example comprise at least one trajectory segment type the projection of which is a projection from the following group: segment of a circle, segment of a parabola, segment of a straight line, 90 degree arc, 180 degree arc, 270 degree arc, 360 degree arc, segment of a loop, projection of an involute of a circle onto a spherical surface, segment of a spiral, stop segment. In a particular embodiment, the user can predefine the arc radius when selecting an arc. A stop segment can include stopping the rotation of the sphere, in particular for a predefined or predefinable period of time. A segment of a loop includes a predefinable sequence of left-hand arc, straight-ahead segment, right-hand arc, straight-ahead segment, left-hand arc, straight-ahead segment etc., the user being able to predefine, preferably individually, the length of the left-hand and right-hand arcs, the radii of the left-hand and right-hand arcs, and the length of the straight-ahead segments. In terms of the geometric shape of the trajectory segment types and thus the geometric shape of the selected trajectory segments, however, there are no fundamental restrictions.

In a very particularly advantageous embodiment, the established trajectory is displayed to the user in the form of a projection onto a two-dimensional plane. This display of the trajectory can serve as a preview for the user, on the basis of which they can evaluate whether all the details of the selected trajectory (which, if appropriate, is still to be supplemented further) are adapted and suitable for the rotational mold to be used. The projection may in particular be a parallel projection or a stereographic projection or a Mercator projection. Such a projection increases clarity for the user and makes it easier to assemble the trajectory from trajectory segments. In principle, any desired trajectory is possible according to the disclosure.

As already mentioned, the rotational-molding device in particular may be in the form of a spherical rotational device. In this respect, it may advantageously in particular be provided that the rotational-mold holder is in the form of a sphere, which is driven in rotation during the rotation operation.

In a particular embodiment, the spherical rotational-mold holder is driven by means of a drive wheel, which rotates about a first axis of rotation and which rolls on the surface of the sphere. Here, the drive wheel may be driven by a first drive motor. In addition, it may advantageously be provided that the drive wheel is mounted so as to be able to rotate about a second axis of rotation which is perpendicular to the first axis of rotation, and a second drive motor is present which can rotate the drive wheel together with the first drive motor about the second axis of rotation. In such an embodiment, from the profile of the selected trajectory, the control device can create a temporal sequence of control signals for at least one drive motor generating the rotation and correspondingly actuate the drive motors, in order that the reference point moves along the selected trajectory during the rotation operation.

In this respect, in particular DC motors equipped with sensors may be used for the drive motors. The sensors allow the alignment of the spherical rotational-mold holder to be established at any time. In this way, a control circuit can be used to ensure and monitor the movement of the reference point along the trajectory. As an alternative or in addition, it is also possible for an alignment sensor, which transmits data regarding the respective current alignment, in particular by radio, to the control device, to be fastened to the rotational mold or to the rotational-mold holder. In this way, it is also possible to monitor whether the reference point moves along the trajectory during the rotation operation as desired. In the case of rotational devices according to the disclosure which are not in the form of spherical rotational devices, the above statements regarding the configuration of the drive motors with sensors and regarding the arrangement of an alignment sensor on the rotational mold or on the rotational-mold holder apply analogously in the same way.

According to an independent concept of the disclosure, which can be realized in combination with the selection of one of multiple trajectories or else on its own, particularly advantageous is a rotational-molding installation which contains a heating station, by means of which a rotational mold can be heated, and a cooling station, in which a rotational mold is cooled down, in particular actively, with the heating station being arranged vertically above the cooling station.

This in particular achieves the object of specifying a rotational-molding installation which operates in a particularly energy-efficient manner.

As a result of the fact that the heating station is arranged vertically above the cooling station, a rotational mold can be transferred from the cooling station to the heating station and from the heating station to the cooling station by a movement which is a pure vertical movement.

The rotational-molding installation according to the disclosure has the very particular advantage that the heat which rises as a rotational mold is being cooled is at least partially utilized by the heating station. In particular, the present disclosure moreover makes it possible to transfer a rotational mold from the heating station to the cooling station and cool it down there without a lot of the heat present in the heating station being able to escape, this being explained in more detail below.

In an advantageous embodiment, the heating station stands on the cooling station and in this respect is vertically supported by the cooling station. This has the particular advantage that the heating station does not require any standing surfaces for its own stands within a workshop.

The rotational-molding installation may advantageously comprise at least one rotary drive, by means of which a rotational mold (in particular jointly with a rotational-mold holder) can be driven in rotation. In particular, it may advantageously be provided that a rotational mold can be heated in the heating station and driven in rotation by means of the rotary drive at the same time, and/or that a rotational mold can be cooled down in the cooling station and driven in rotation by means of the rotary drive at the same time.

In an advantageous embodiment, the heating station comprises a heating station housing. The heating station housing preferably has a thermally insulating design. In particular, it may advantageously be provided that the heating station housing has a double-walled design, it advantageously being possible to arrange a thermally insulating material, for example glass wool or foam glass or at least one vacuum insulation panel or another insulation material, between the walls.

The cooling station may comprise a cooling station housing. In particular, a thermal insulation device may advantageously be arranged between the heating station housing and the cooling station housing. The thermal insulation device may for example comprise pointed spacers, via which the heating station standing on the cooling station is supported on the cooling station. The thermal insulation device has the task of reducing the transfer of heat from the heating station housing to the cooling station housing. The thermal insulation device may advantageously in particular be arranged in such a way that an upper opening in the cooling station housing and a lower opening in the heating station housing remain free. In particular, the thermal insulation device may adjoin the lower edges of the heating station housing and the upper edges of the cooling station housing around the periphery.

In a very particularly advantageous embodiment, the heating station housing has a downwardly aligned opening. In terms of good heat insulation, it may advantageously be provided that the downwardly aligned opening is the only opening in the heating station housing. This advantageously has the effect that a rotational mold (in particular together with a rotational-mold holder and/or a rotational device) can be removed from the heating station largely without a lot of the heat present in the heating station being able to escape.

The cooling station housing may advantageously have an upper opening, which is in line with the downwardly aligned opening in the heating station housing such that a rotational mold, in particular traveling vertically in a straight line, can be transferred from the cooling station housing to the heating station housing and/or from the heating station housing to the cooling station housing through the upper opening in the cooling station housing and the lower opening in the heating station housing. In particular, the rotational-molding installation may be designed in such a way that a rotational mold, together with a rotational-mold holder and/or a rotational device, in particular traveling vertically in a straight line, in particular on the shortest path, can be transferred from the cooling station housing to the heating station housing and/or from the heating station housing to the cooling station housing through the upper opening in the cooling station housing and the lower opening in the heating station housing.

In a very particularly advantageous embodiment, an elevator is present, by means of which a rotational mold or a rotational mold together with a rotational-mold holder can be transferred from the cooling station to the heating station and/or from the heating station to the cooling station, in particular in a motorized and/or pneumatically and/or hydraulically driven manner. In particular, it may advantageously be provided that a rotational mold is transferred automatically from the cooling station to the heating station and/or from the heating station to the cooling station by means of the elevator, provided that predefined or predefinable process parameters have been obtained or predefined or predefinable process times have elapsed. In an advantageous embodiment, the rotational mold is transferred automatically from the heating station to the cooling station by means of the elevator after a predetermined or predeterminable heating time has elapsed.

The rotational-molding installation may very particularly advantageously comprise a rotational device, which can be transferred from the cooling station housing to the heating station housing and/or from the heating station housing to the cooling station housing by means of the elevator. In particular, the rotational device may be a spherical rotational device, which comprises a receptacle for the spherical rotational-mold holder. In particular, it may advantageously be provided that the rotational-mold holder is driven by means of a drive wheel, which rolls on the surface of the spherical rotational-mold holder.

In a very particularly advantageous embodiment, the rotational device comprises a platform which closes the downwardly aligned opening in the heating station housing when the rotational device is in the heating station housing. In particular, the platform may have a heat-resistant seal, in particular a brush seal, around the periphery on its peripheral edge.

As an alternative or in addition, the rotational device may comprise an in particular thermally insulating cover plate which closes the downwardly aligned opening in the heating station housing when the rotational device is in the cooling station housing. In particular, the cover plate may have a heat-resistant seal, in particular a brush seal, around the periphery on its peripheral edge.

In another embodiment, the drive device (except for a small part of the drive wheel protruding through a rotatably mounted plate) always remains outside of the heating station. For example, it may advantageously be provided that the drive wheel protrudes through a slot in a round plate, which is rotatably mounted and which is always rotated together with the drive wheel about a vertical axis. The plate may be rotatably mounted in a frame plate. It may advantageously be provided that, by bearing against the brush seal, the plate and the frame plate close a downwardly aligned opening in the heating station housing when the rotational-mold holder is in the heating station, whereas, by bearing against the brush seal, a thermally insulating cover plate closes the opening in the heating station housing when the rotational-mold holder is in the cooling station.

The rotational-mold holder may have a multiplicity of apertures. The apertures allow hot air and cold air to arrive at the rotational mold through the wall of the rotational-mold holder, in order to make it possible to be able to use hot air to heat the rotational mold arranged in the rotational-mold holder and to use cold air to cool it down.

In a particular embodiment, the cooling station housing has a further, in particular lateral, opening through which a rotational mold or an in particular spherical rotational-mold holder holding a rotational mold can be conveyed into the cooling station and, after a cooling operation, can be conveyed out of the cooling station. In particular, a closure, in particular a sliding door or a roller shutter or a door, by means of which the further opening can be closed is present.

In a very particularly advantageous embodiment, the cooling station comprises a cold-air fan. The cold-air fan may very particularly advantageously comprise a slot-shaped cold-air nozzle. In particular, it may advantageously be provided that the cold-air nozzle is aligned symmetrically in relation to a rotational-mold holder and/or rotational mold arranged in the cooling station and/or that the cold-air nozzle is aligned in such a way that a stream of cold air is aligned symmetrically in relation to a rotational-mold holder and/or rotational mold arranged in the cooling station. In this way, it is advantageously ensured that the rotational-mold holder and/or the rotational mold are not additionally driven in rotation by the stream of cold air. Additional rotary drive provided by the stream of cold air could specifically disadvantageously lead to a predefined rotation trajectory not being maintained.

In a very particularly advantageous embodiment, the heating station comprises a hot-air fan. The hot-air fan may very particularly advantageously comprise a slot-shaped hot-air nozzle. In particular, it may advantageously be provided that the hot-air nozzle is aligned symmetrically in relation to a rotational-mold holder and/or rotational mold arranged in the heating station and/or that the hot-air nozzle is aligned in such a way that a stream of hot air is aligned symmetrically in relation to a rotational-mold holder and/or rotational mold arranged in the heating station. In this way, it is advantageously ensured that the rotational-mold holder and/or the rotational mold are not additionally driven in rotation by the stream of hot air. Additional rotary drive provided by the stream of hot air could specifically disadvantageously lead to a predefined rotation trajectory not being maintained.

The rotational-molding installation may advantageously comprise at least one temperature measuring device, in particular a pyrometer, by means of which the temperature of a rotational mold arranged in the heating station and/or the cooling station can be measured. The temperature measuring device makes it possible in particular to monitor whether the rotational mold has the respective required temperature during the different process steps. In particular, it is possible to control the heating operation and/or the cooling operation, for example by regulating the temperature and/or the flow velocity of a stream of hot air or stream of cold air.

Particularly advantageous is a rotational-molding system which comprises a rotational-molding installation according to the disclosure and at least one rotational mold or at least one rotational-mold holder in which a rotational mold is arranged.

In particular (according to the independent concept of the disclosure), a rotational-molding installation having at least one of the following aspects is particularly advantageous:

1. A rotational-molding installation containing a heating station, by means of which a rotational mold can be heated, and a cooling station, in which a rotational mold can be cooled down, in particular actively, characterized in that the heating station is arranged vertically above the cooling station.
2. The rotational-molding installation according to aspect 1, characterized in that the heating station stands on the cooling station.
3. The rotational-molding installation according to aspect 1 or 2, characterized in that a rotary drive is present.
4. The rotational-molding installation according to aspect 3, characterized in that a rotational mold can be heated in the heating station and driven in rotation by means of the rotary drive at the same time.
5. The rotational-molding installation according to aspect 3 or 4, characterized in that a rotational mold can be cooled down in the cooling station and driven in rotation by means of the rotary drive at the same time.
6. The rotational-molding installation according to one of aspects 1 to 5, characterized in that the cooling station comprises a cooling station housing.
7. The rotational-molding installation according to one of aspects 1 to 6, characterized in that the heating station comprises a heating station housing.
8. The rotational-molding installation according to aspect 7, characterized in that the heating station housing has a thermally insulating design and/or in that the heating station housing is made at least partially from a thermally insulating material.
9. The rotational-molding installation according to aspect 6 and 7, characterized in that a thermal insulation device is arranged between the heating station housing and the cooling station housing.
10. The rotational-molding installation according to aspect 9, characterized in that the insulation device comprises pointed spacers.
11. The rotational-molding installation according to aspect 10, characterized in that the heating station is supported on the cooling station via the spacers, in particular exclusively via the spacers.
12. The rotational-molding installation according to one of aspects 1 to 11, characterized in that the heating station housing has a downwardly aligned opening.
13. The rotational-molding installation according to aspect 12, characterized in that the downwardly aligned opening is the only opening in the heating station housing.
14. The rotational-molding installation according to aspect 12 or 13, characterized in that the cooling station housing has an upper opening, which is in line with the downwardly aligned opening in the heating station housing such that a rotational mold, in particular traveling vertically in a straight line, can be transferred from the cooling station housing to the heating station housing and/or from the heating station housing to the cooling station housing through the upper opening in the cooling station housing and the lower opening in the heating station housing.
15. The rotational-molding installation according to one of aspects 1 to 14, characterized in that an elevator is present, by means of which a rotational mold or a rotational mold together with a rotational-mold holder can be transferred from the cooling station to the heating station and/or from the heating station to the cooling station.
16. The rotational-molding installation according to aspect 15, characterized in that the rotational-molding installation comprises a rotational device, which can be transferred from the cooling station housing to the heating station housing and/or from the heating station housing to the cooling station housing by means of the elevator.
17. The rotational-molding installation according to aspect 16, characterized in that the rotational device is a spherical rotational device, which has a receptacle for a spherical rotational-mold holder.
18. The rotational-molding installation according to aspect 17, characterized in that the rotational-mold holder is driven by means of a drive wheel, which rolls on the surface of the spherical rotational-mold holder.
19. The rotational-molding installation according to aspect 17 or 18, characterized in that the rotational-mold holder has a multiplicity of apertures.
20. The rotational-molding installation according to one of aspects 17 to 19, characterized in that the cooling station housing has a further, in particular lateral, opening through which a rotational-mold holder in the form of a sphere can be conveyed into the cooling station and, after a cooling operation, can be conveyed out of the cooling station.
21. The rotational-molding installation according to aspect 20, characterized in that a closure, in particular a sliding door or a roller shutter or a door, for the further opening is present.
22. The rotational-molding installation according to one of aspects 1 to 21, characterized in that the cooling station comprises a cold-air fan.
23. The rotational-molding installation according to aspect 22, characterized in that the cold-air fan comprises a slot-shaped nozzle.
24. The rotational-molding installation according to aspect 22 or 23, characterized in that the nozzle is aligned symmetrically in relation to a rotational-mold holder and/or rotational mold arranged in the cooling station and/or in that the nozzle is aligned in such a way that a stream of cold air is aligned symmetrically in relation to a rotational-mold holder and/or rotational mold arranged in the cooling station.
25. The rotational-molding installation according to one of aspects 1 to 24, characterized in that the heating station comprises a hot-air fan.
26. The rotational-molding installation according to aspect 25, characterized in that the hot-air fan comprises a slot-shaped nozzle.
27. The rotational-molding installation according to aspect 25 or 26, characterized in that the nozzle is aligned symmetrically in relation to a rotational-mold holder and/or rotational mold arranged in the heating station and/or in that the nozzle is aligned in such a way that a stream of hot air is aligned symmetrically in relation to a rotational-mold holder and/or rotational mold arranged in the heating station.
28. The rotational-molding installation according to one of aspects 1 to 27, characterized in that the rotational-molding installation comprises at least one temperature measuring device, in particular a pyrometer, by means of which the temperature of a rotational mold arranged in the heating station and/or the cooling station can be measured.
29. A rotational-molding system containing a rotational-molding installation according to one of aspects 1 to 28 and containing at least one rotational mold or at least one rotational-molding holder in which a rotational mold is arranged.

BRIEF DESCRIPTION OF THE DRAWING VIEWS

Figure 2:
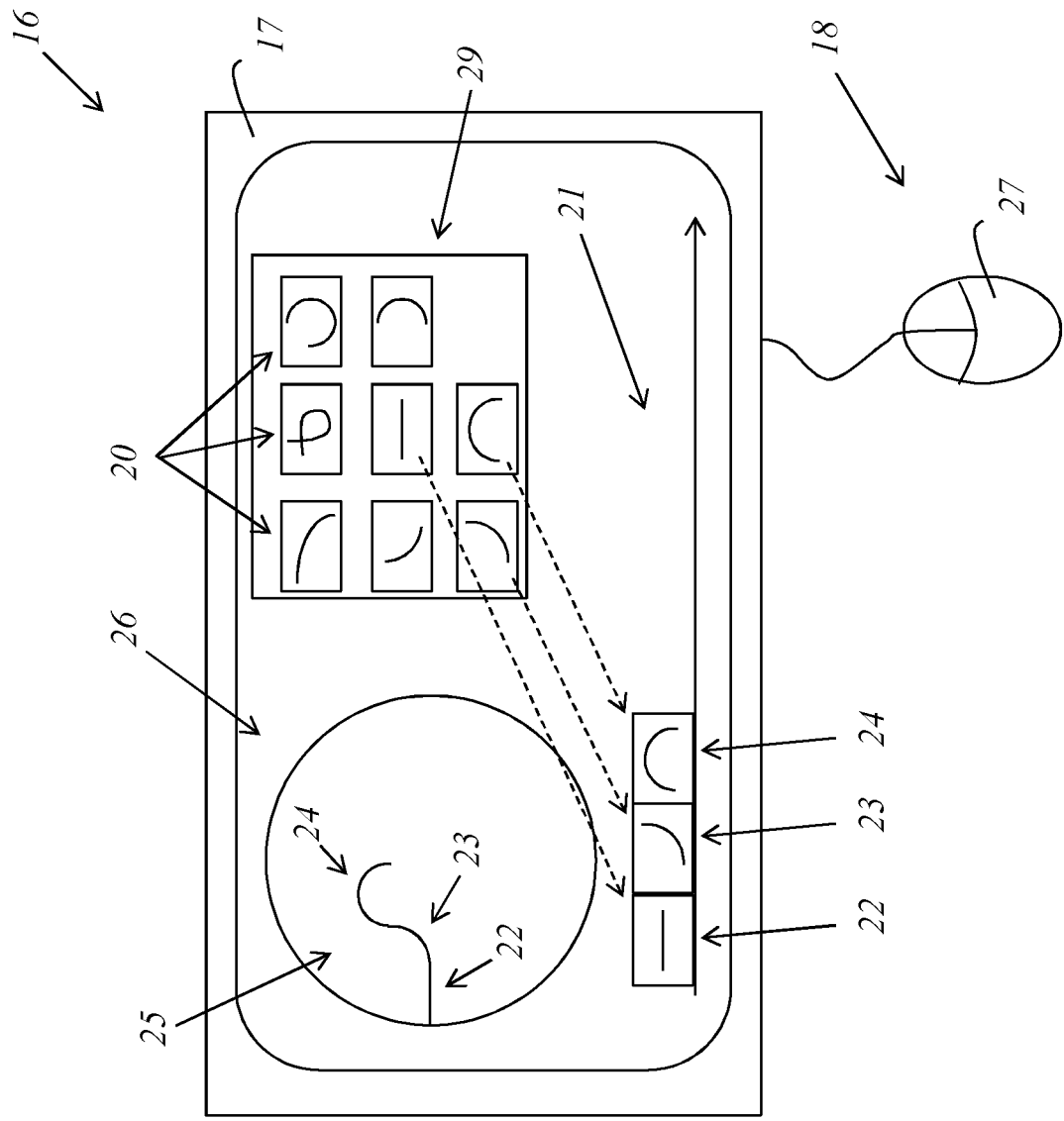
Figure 3:
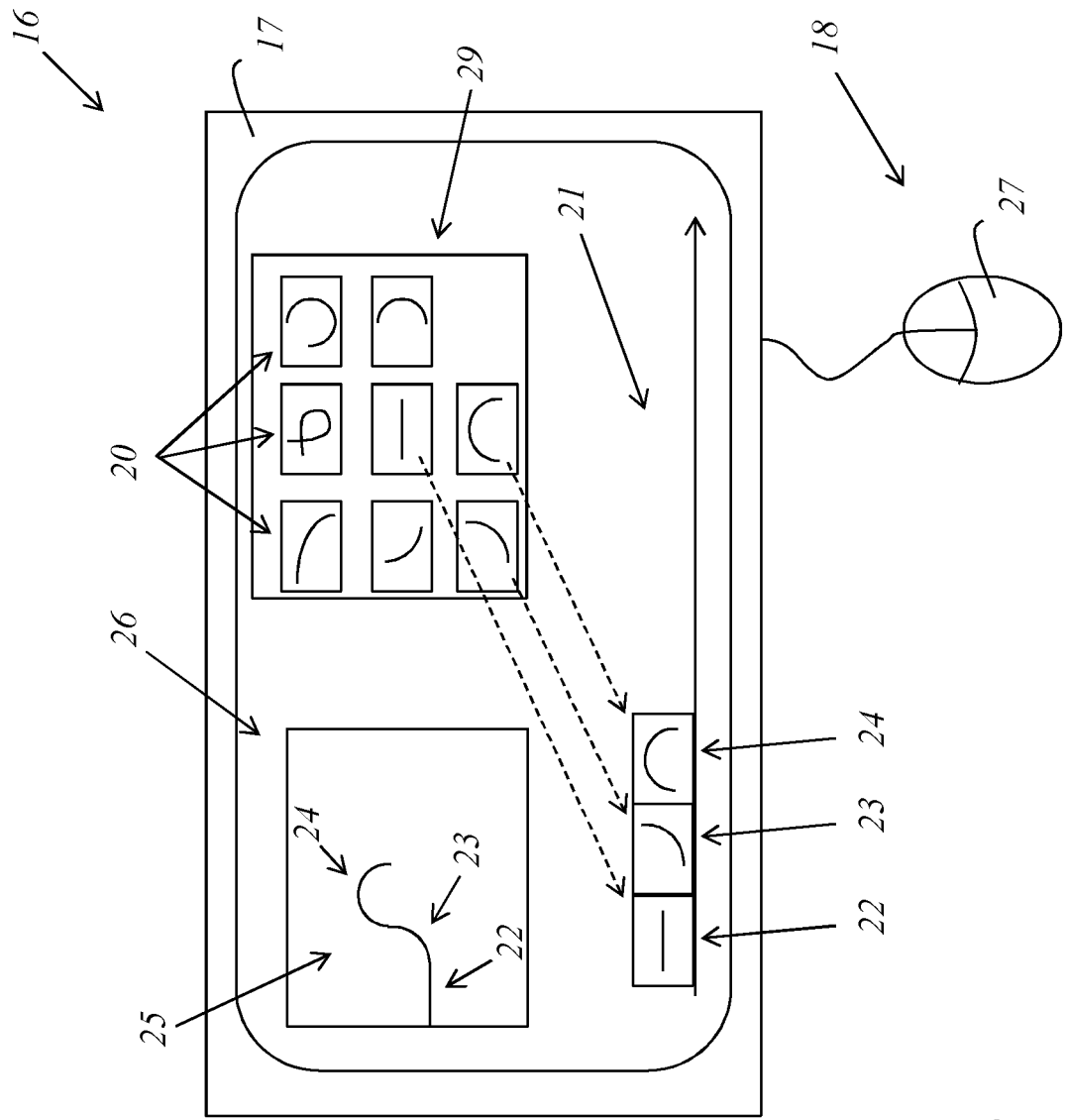
Figure 4:
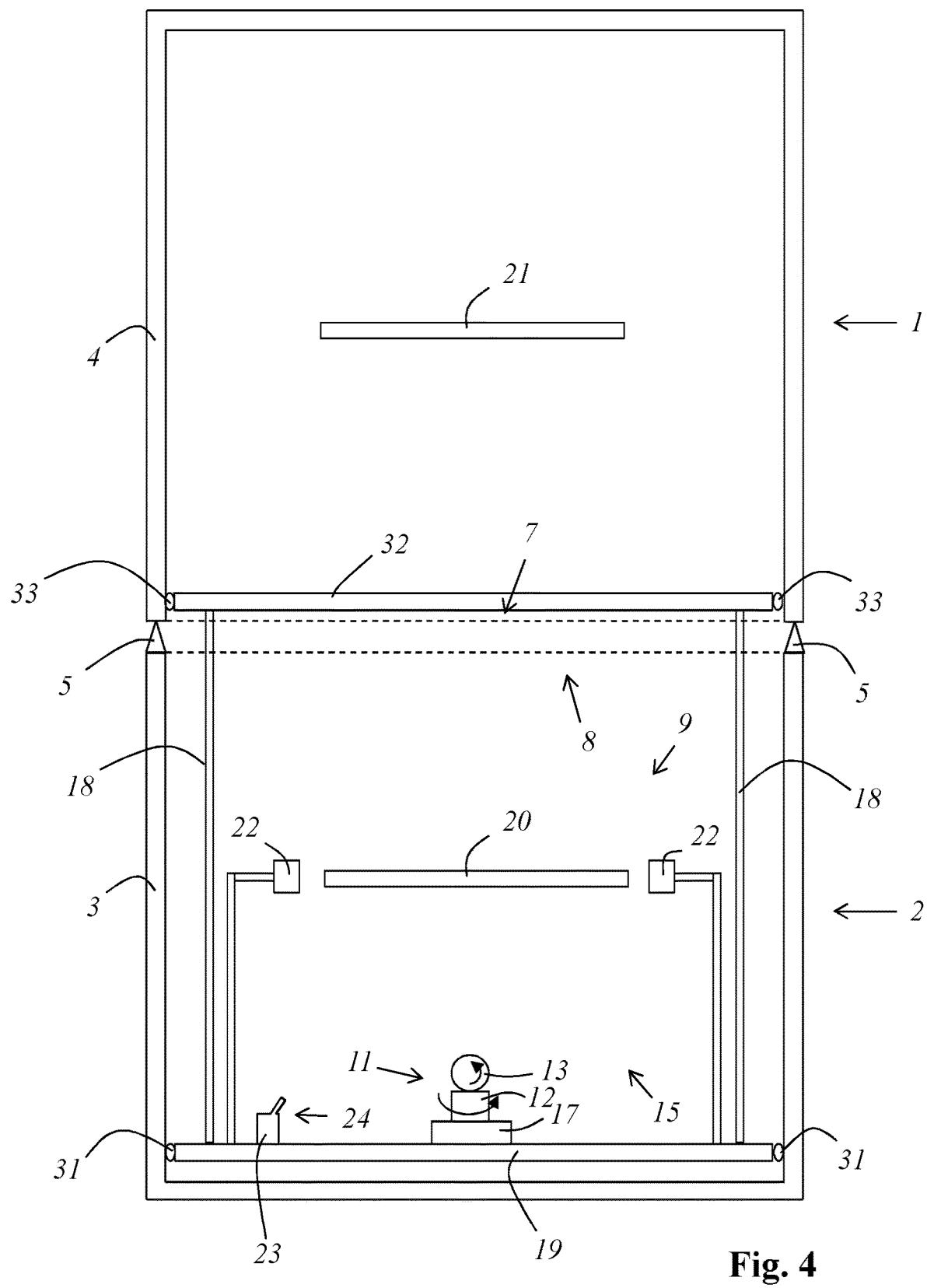
Figure 5:
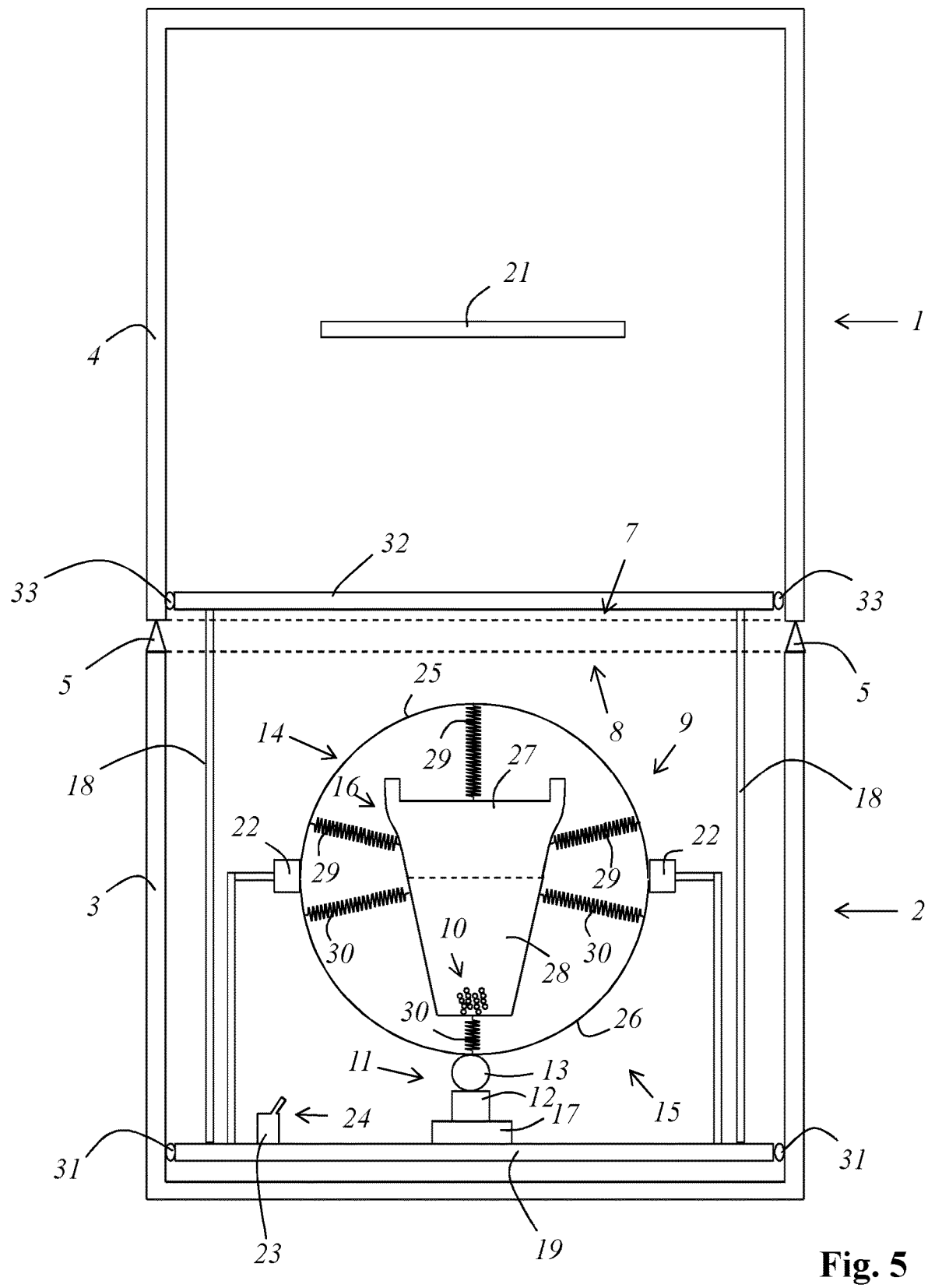
Figure 6:
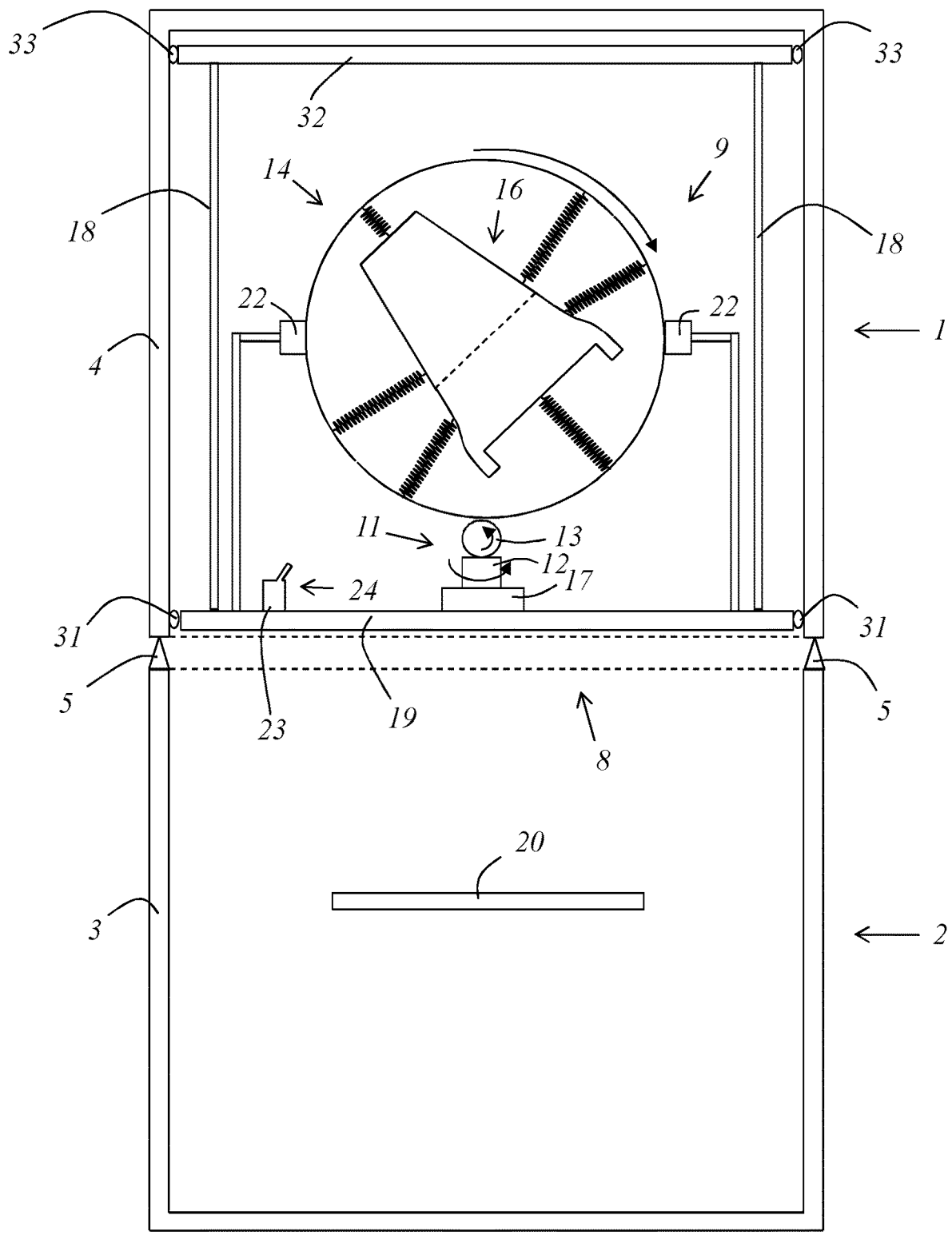
Figure 7:
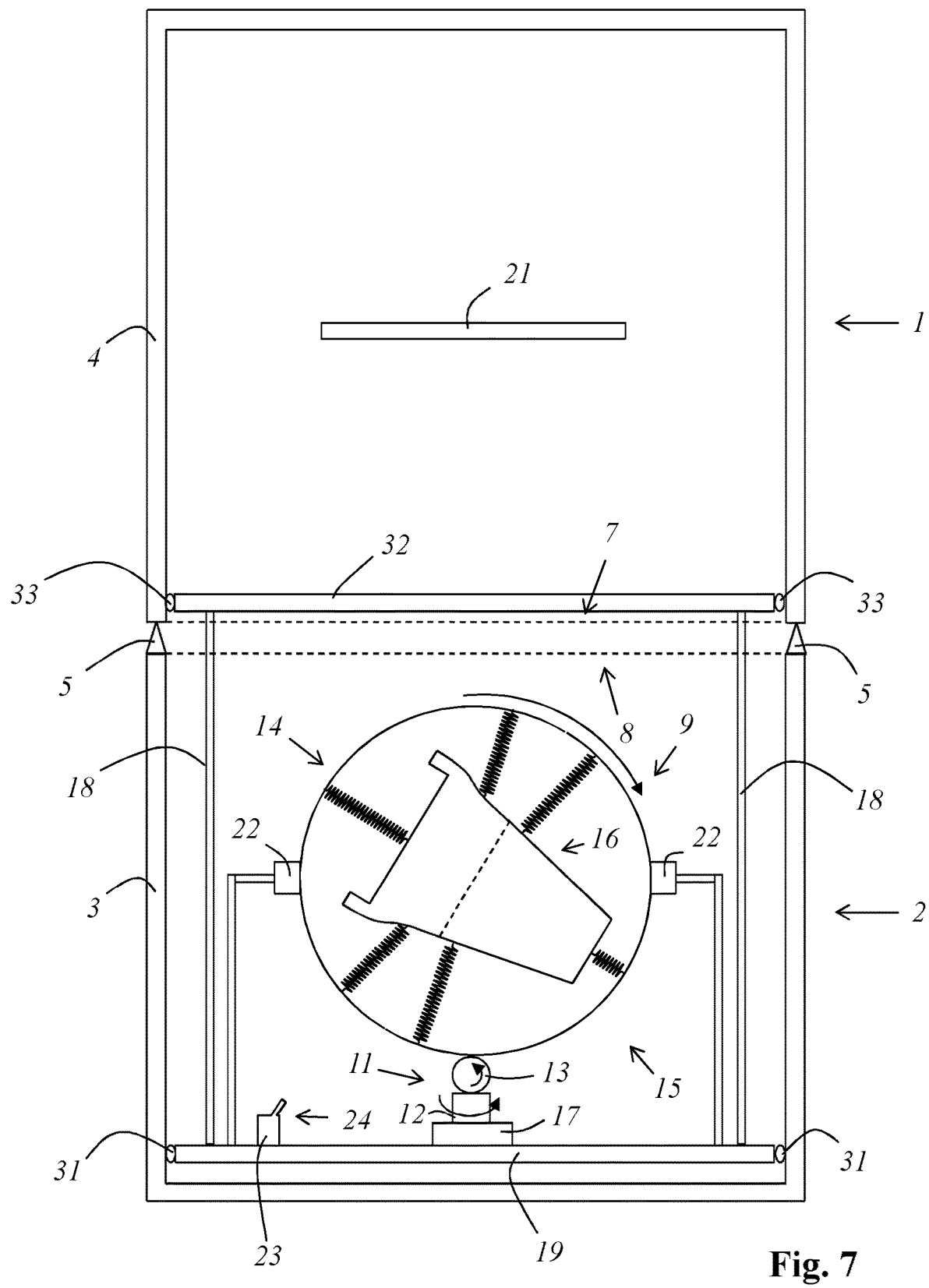
Figure 8:
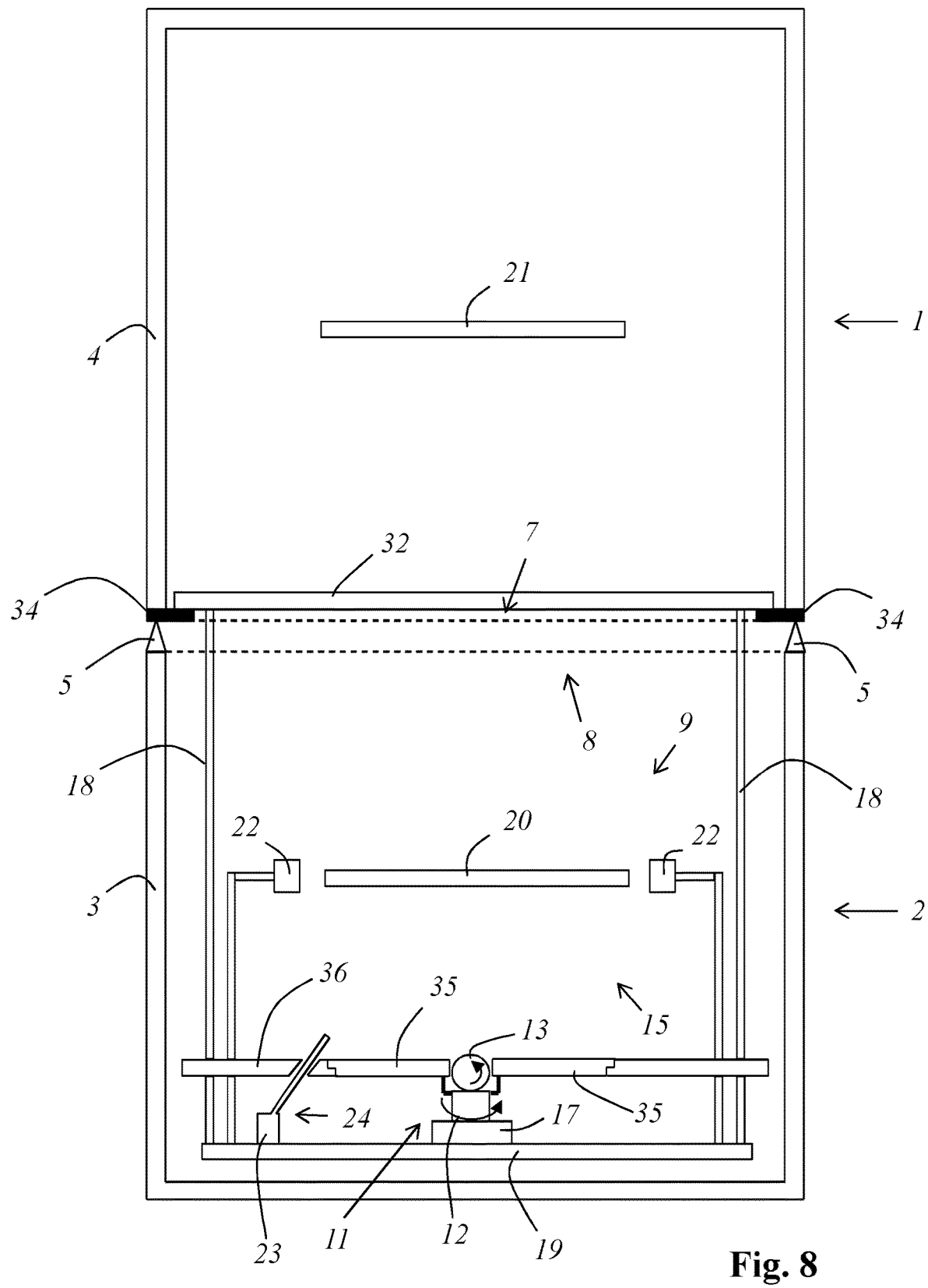
Figure 9:
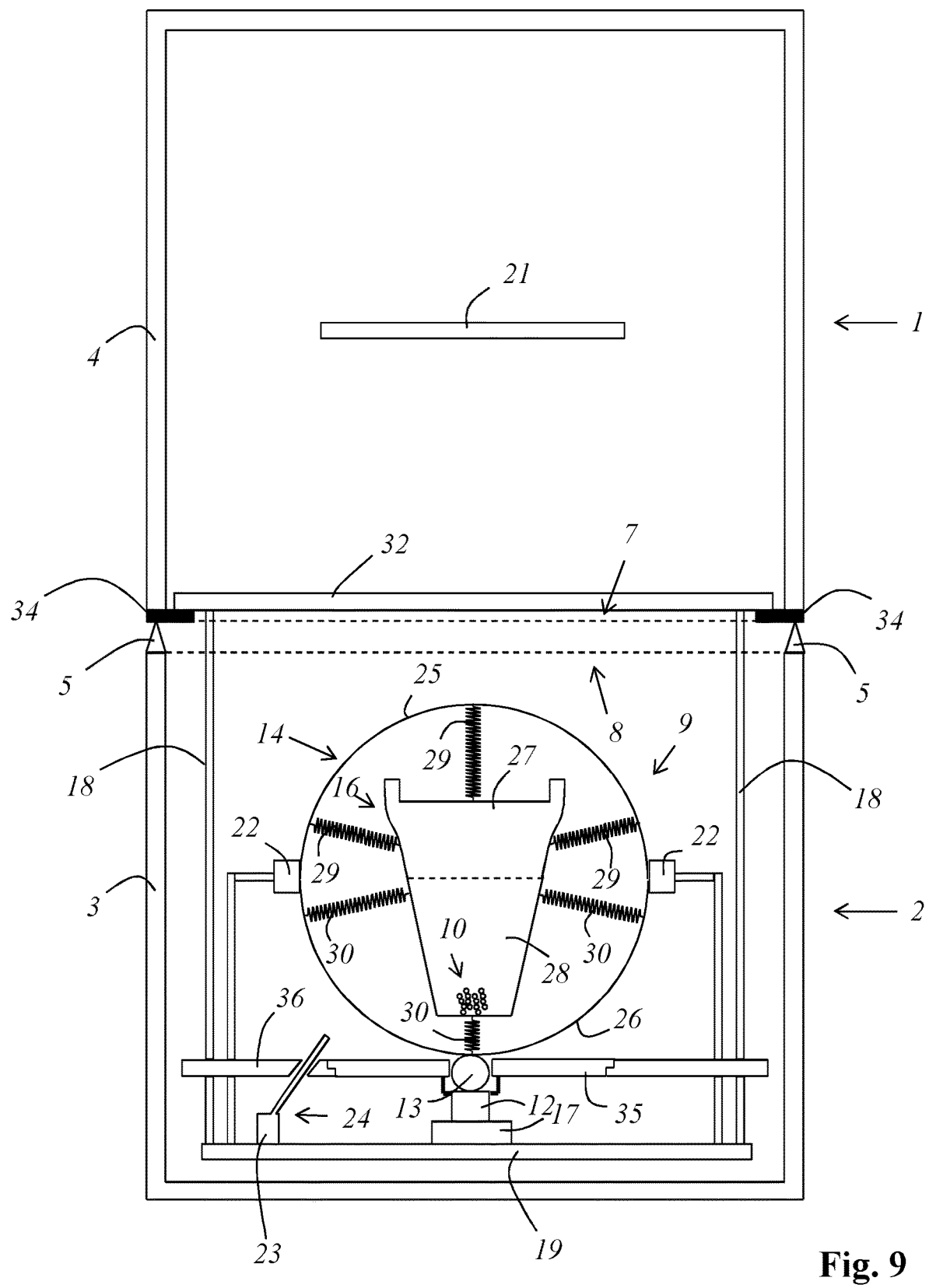
Figure 10:
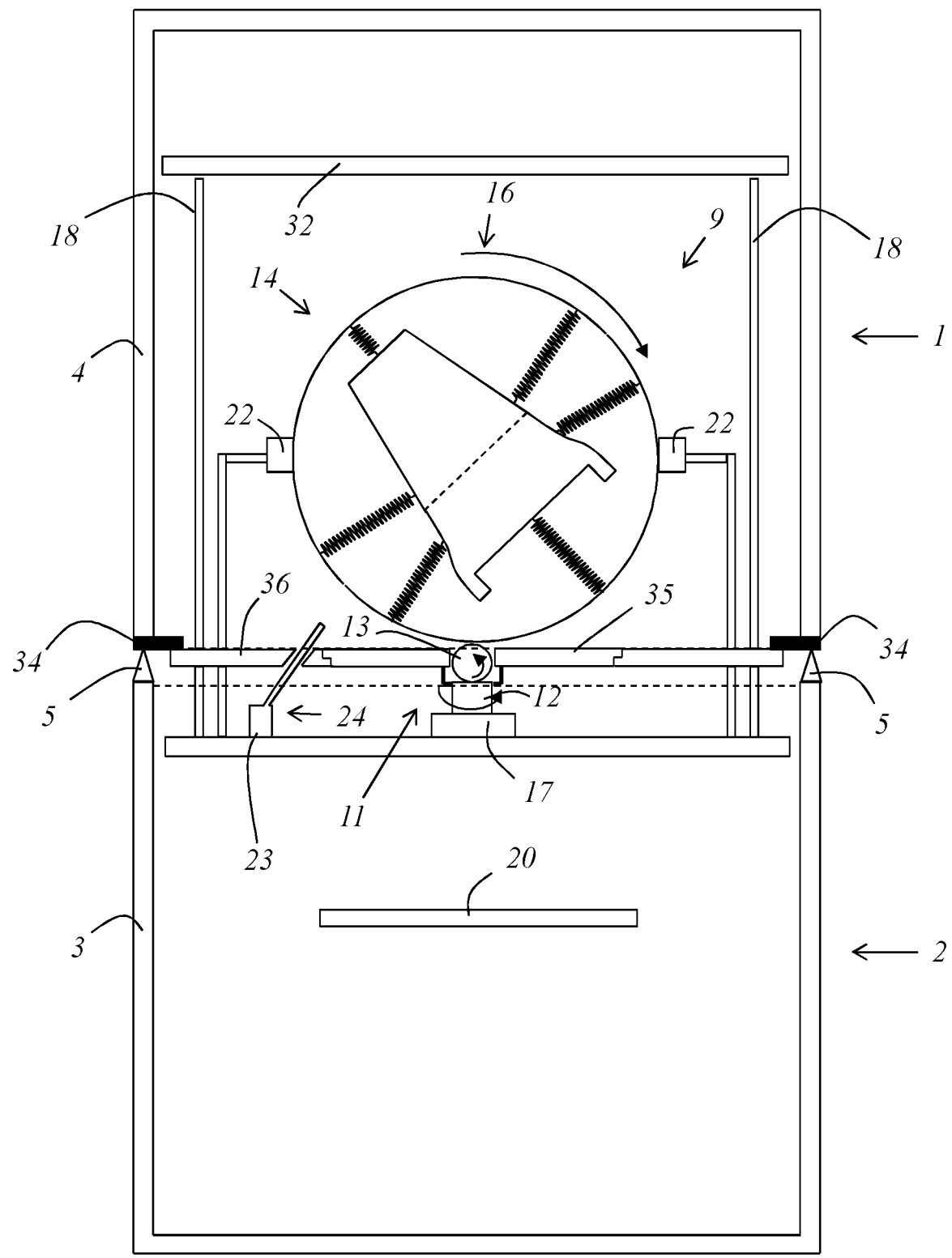
Figure 11:
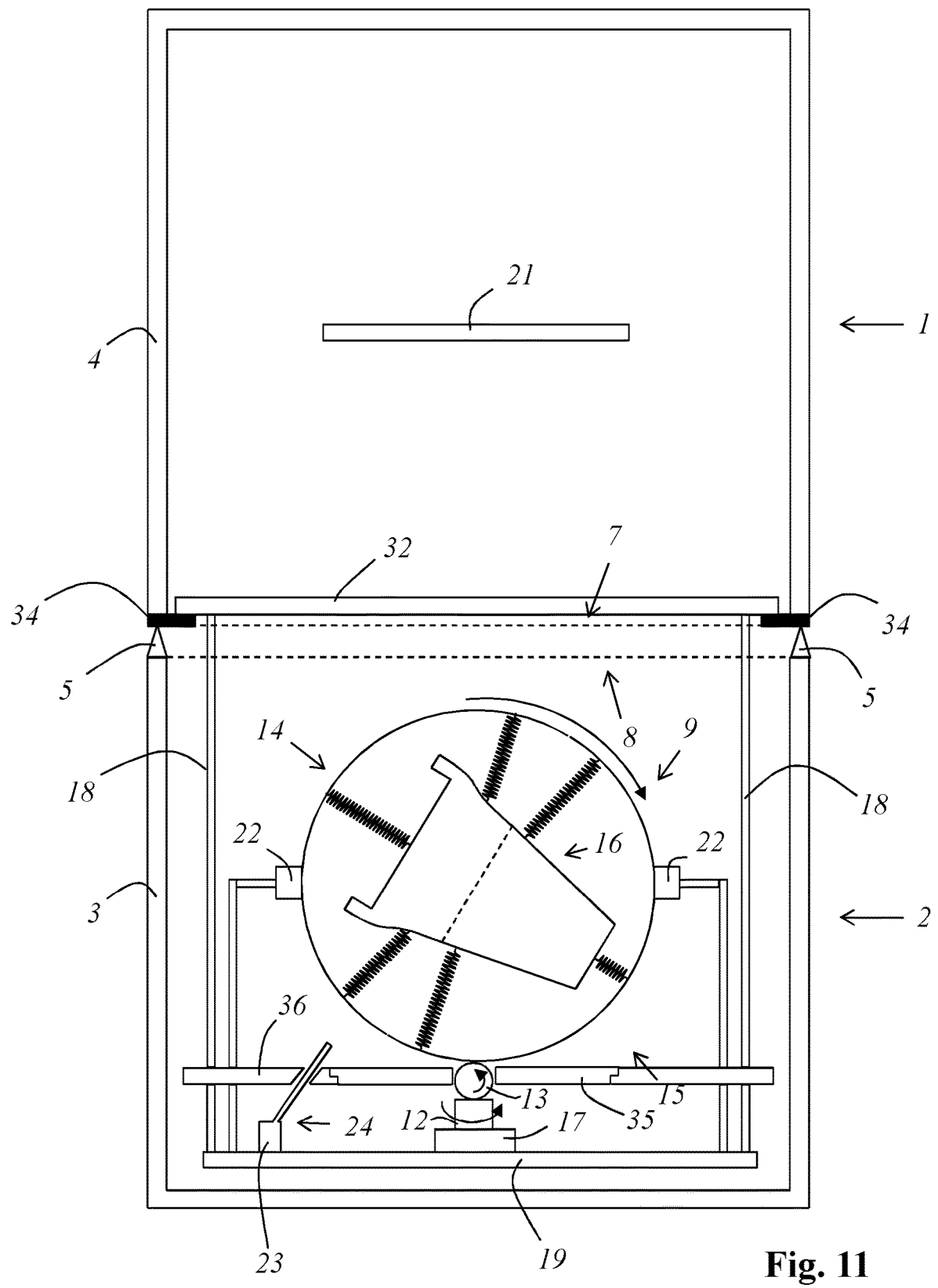

In the drawing, the subject matter of the disclosure is illustrated schematically and by way of example and will be described below with reference to the figures, with elements that are the same or have the same action are usually provided with the same reference signs even in different exemplary embodiments. In the figures:

FIG. 1 shows an exemplary embodiment of a rotational-molding device according to the disclosure, FIG. 2 shows an exemplary embodiment of an input device of a rotational-molding device according to the disclosure, FIG. 3 shows another exemplary embodiment of an input device of a rotational-molding device according to the disclosure, FIG. 4 shows an exemplary embodiment of a rotational-molding installation according to the disclosure as per an independent concept of the disclosure, FIG. 5 shows the exemplary embodiment after a spherical rotational-mold holder together with a rotational mold held therein has been introduced, FIG. 6 shows the exemplary embodiment of the rotational-molding installation after the entire rotational device has been moved vertically upward into the heating station, FIG. 7 shows the exemplary embodiment of the rotational-molding installation after the rotational device has been moved back into the cooling station, FIG. 8 shows a further exemplary embodiment of a rotational-molding installation according to the disclosure as per the independent concept of the disclosure, FIG. 9 shows the further exemplary embodiment after a spherical rotational-mold holder together with a rotational mold held therein has been introduced, FIG. 10 shows the further exemplary embodiment of the rotational-molding installation after the entire rotational device has been moved vertically upward into the heating station, FIG. 11 shows the further exemplary embodiment of the rotational-molding installation after the rotational device has been moved back into the cooling station.

DETAILED DESCRIPTION

FIG. 1 shows an exemplary embodiment of a rotational-molding device according to the disclosure, which comprises a rotational-mold holder 1 and a rotational mold 2. The rotational-mold holder 1 is in the form of a sphere, which is driven in rotation during a rotation operation. In the example shown, the rotational mold 2 is designed to produce a plant pot. In terms of the type of object to be produced, however, there are no fundamental restrictions.

The rotational-mold holder 1 consists of a first hemisphere 3 and a second hemisphere 4, which can be detachably connected to one another.

The rotational mold 2 likewise has a two-part structure and has a first rotational-mold part 5 and a second rotational-mold part 6. The first rotational-mold part 5 is fastened to the inside of the first hemisphere 3 by means of first springs 7, whereas the second rotational-mold part 6 is fastened to the inside of the second hemisphere 4 by means of second springs 8. The first hemisphere 3 together with the first rotational-mold part 5 can be lifted off from the second hemisphere 4 together with the second rotational-mold part 6, in order to be able to introduce rotational-molding material 9 into the rotational mold 2 before a rotation operation and to be able to remove the produced product after a rotation operation.

After introducing the rotational-molding material 9, the first rotational-mold part 5 is fitted onto the second rotational-mold part 6 and thus closes the rotational-mold holder 1. Then, the rotation operation can begin. During the rotation operation, the rotational mold 2 is rotated and heated at the same time, in order that the previously introduced rotational-molding material 9 can melt and accumulate on the inner side of the rotational mold 2.

The rotational-mold holder 1 is driven in rotation by means of a drive device 10. The drive device 10 contains a drive motor 11, which drives a drive wheel 12 in rotation about a horizontal axis. The drive wheel 12 is in frictional contact with the outer side of the rotational-mold holder 1 and drives it in rotation together with the rotational mold held therein.

The entire drive device 10 may be rotated about a vertical axis by means of a further drive device 13 comprising a second drive motor 14, in order to be able to change the alignment of the horizontal axis of rotation about which the drive wheel 12 rotates. In the event of a change in alignment of the horizontal axis of rotation about which the drive wheel 12 rotates, the alignment of the axis of rotation about which the rotational mold 1 rotates also changes automatically.

The rotational-mold holder 1 is held in position whilst it rotates by means of laterally arranged grinding plates 15. The rotational-mold holder 1 remains stationary during the rotation operation.

The rotational-molding device 1 comprises an input device 16. The input device 16 comprises a display device 17 and an input unit 18, which is in the form of a computer mouse 27. The input device 16 can be used to select a trajectory 25 of a reference point 28 on the rotational-mold holder 1 or the rotational mold 2 for a rotation operation from multiple possible trajectories which can be performed by the rotational-molding device 1.

The control device 19 controls the drive device 10 and the further drive device 13 during a rotation operation in such a way that the reference point 28 moves along a selected trajectory. To that end, from the profile of the trajectory 25, the control device 19 creates a temporal sequence of control signals for the drive device 10 and the further drive device 13. The reference point 28 may (as in this exemplary embodiment) for example be that point on the outer side of the rotational-mold holder 1 that is right at the bottom and in contact with the drive wheel 12 at the beginning of the rotation operation. The trajectory runs exclusively on a spherical surface, specifically the spherical surface corresponding to the outer side of the rotational-mold holder 1.

It is important for the rotational-mold holder 1 at the beginning of the rotation operation to be aligned such that the reference point is at the start of the selected trajectory. It is also important for the control device at the beginning of the rotation operation to know the precise rotational alignment of the rotational-mold holder 1. To that end, advantageously, sensors may be present on the drive device 10 and/or the further drive device 13 and/or alignment sensors may be present on the rotational-mold holder 1 or the rotational mold 2 which transmit information about the respective current alignment of the rotational-mold holder 1 to the control device 19.

In particular, it may advantageously be provided that trajectory segments can be input and transmitted to a control device 19, with the control device 19 establishing the trajectory 25 from the trajectory segments that were input by stringing together the trajectory segments that were input.

FIG. 2 shows an exemplary embodiment of an input device 16 of a rotational-molding device according to the disclosure. The input device 16 comprises a display device 17 in the form of a monitor. Moreover, the input device 16 comprises an input unit 18 in the form of a computer mouse 27.

The display device 17 displays to the user a selection display 29 of different trajectory segment types 20, from which the user can select successive individual trajectory segments 22, 23, 24 by means of the input unit 18 and arrange them in a timeline 21. The arrangement of the individual trajectory segments 22, 23, 24 is effected in that the user clicks on a respective one of the trajectory segment types 20 by means of the input unit 18 in the form of a computer mouse 27 and moves the trajectory segment types that were clicked on to the timeline 21 when a mouse button is pressed, as a result of which the symbol is duplicated and the duplicate is deposited on the timeline 21. This operation is indicated symbolically in FIG. 2 by the dashed-line arrows.

The result of stringing together the trajectory segments 22, 23, 24 is the trajectory 25, along which the reference point 28 moves during a rotation operation.

The display device 17 moreover displays to the user a preview display 26, in which the surface of the rotational-mold holder 1 is depicted in two dimensions. Moreover, the trajectory 25 assembled from the trajectory segments 22, 23, 24 is displayed to the user in the preview display 26.

The user has the option, in addition to each trajectory segment 22, 23, 24, of inputting a parameter from the following group: trajectory segment length, trajectory segment curvature and trajectory segment curvature profile. Moreover, the user has the option of assigning a speed or speed variation to each trajectory segment 22, 23, 24. The speed or speed variation specifies the dynamics with which the reference point 28 moves along the respective trajectory segment 22, 23, 24 during a rotation operation.

FIG. 3 shows another exemplary embodiment of a display device 17 of a rotational-molding device according to the disclosure. The display device shown in FIG. 3 differs from the embodiment illustrated in FIG. 2 in terms of the preview display 26. The preview display 26 is a Mercator projection of the spherical surface of the rotational-mold holder 1 into a plane, similar to the projection of a satellite orbit onto a two-dimensional map.

Since FIGS. 4 to 11 relate to an independent concept of the disclosure, which may also be realized in combination with the exemplary embodiments illustrated in FIGS. 1 to 3 or else on its own, distinct reference signs are used as specified below:

1 Heating station
2 Cooling station
3 Cooling station housing
4 Heating station housing
5 Insulating device
6 Spacer
7 Downwardly aligned opening in the heating station housing 4

8 Upper opening in the cooling station housing
9 Rotational device
10 Rotational-molding material
11 Rotary drive
12 First drive motor
13 Drive wheel
14 Rotational-mold holder
15 Receptacle
16 Rotational mold
17 Second drive motor
18 Vertical carrier
19 Platform
20 Cold-air nozzle
21 Hot-air nozzle
22 Grinding plate
23 Pyrometer
24 Temperature measuring device
25 First hemisphere
26 Second hemisphere
27 First rotational molding
28 Second rotational molding
29 First springs
30 Second springs
31 First brush seal
32 Cover plate
33 Second brush seal
34 Brush seal
35 Rotatably mounted plate
36 Frame plate FIG. 4 shows an exemplary embodiment of a rotational-molding installation according to the disclosure, which comprises a heating station 1 and a cooling station 2. The heating station 1 is arranged vertically above the cooling station 2.

The cooling station 2 has a cooling station housing 3 and the heating station 1 has a heating station housing 4. The heating station housing 4 has a thermally insulating design. In particular, it may advantageously be provided that the heating station housing 4 has a double-walled design, it advantageously being possible to arrange a thermally insulating material, for example glass wool or foam glass or at least one vacuum insulation panel or another insulation material, between the walls.

A thermal insulation device 5 is arranged between the heating station housing 4 and the cooling station housing 3. The thermal insulation device 5 contains pointed spacers 6, via which the heating station 1 standing on the cooling station 2 is supported. The thermal insulation device 5 adjoins the four lower edges of the heating station housing 4 and the four upper edges of the cooling station housing 3 around the periphery. The thermal insulation device 5 reduces the transfer of heat from the heating station housing 4 to the cooling station housing 3.

The rotational-molding installation comprises a rotational device 9 with a rotary drive 11. The rotational drive 11 contains a first drive motor 12, which drives a drive wheel 13 in rotation about a horizontal axis. The drive wheel 13 is designed to be in frictional contact with the outer side of a rotational-mold holder 14 (not illustrated in this figure), which can be inserted into a receptacle 15 of the rotational device 9.

A spherical rotational-mold holder 14 holding a rotational mold 16 may be arranged and driven in rotation in the receptacle 15. This is illustrated in FIGS. 5, 6 and 7. The receptacle 15 comprises laterally arranged grinding plates 22, which hold a rotational-mold holder 14 in position during the rotation operation.

The drive wheel 13 together with the first drive motor 12 may be rotated about a vertical axis by means of a second drive motor 17, in order to be able to change the alignment of the horizontal axis of rotation about which the drive wheel 13 rotates. In the event of a change in alignment of the horizontal axis of rotation about which the drive wheel 13 rotates, the alignment of the axis of rotation about which the rotational mold 14 together with the rotational mold 16 held therein rotates also changes automatically.

The heating station housing 4 has a downwardly aligned opening 7 and the cooling station housing 3 has an upwardly aligned opening 8. The upper opening 8 in the cooling station housing 3 is in line with the downwardly aligned opening 7 of the heating station housing 4 such that the entire rotational device 9 together with a rotational-mold holder 14 located in the receptacle 15 can be transferred vertically from the cooling station 2 to the heating station 1 and, in reverse, from the heating station 1 back to the cooling station 2. To that end, an elevator with guide rails (not illustrated) is present. A platform 19 of the rotational device 9 is mounted displaceably in a motor-driven manner on the guide rails (not illustrated).

Along its outer peripheral edge, the platform 19 has a first brush seal 31, which first brush seal 31 is in contact with the inner side of the cooling station housing 3 as long as the elevator is in the lower position (FIGS. 4, 5 and 7) and in contact with the inner side of the heating station housing 4 when the elevator is in the upper position (FIG. 6). The platform 19 closes the downwardly aligned opening 7 in the heating station housing 4 when the elevator is in the upper position (FIG. 6).

The platform 19 bears four vertical carriers 18, which for their part bear a thermally insulating cover plate 32, which is arranged parallel to the platform 19. Along its outer peripheral edge, the cover plate 32 has a second brush seal 33 which is in contact with the inner side of the heating station housing 4. The cover plate 32 closes the downwardly aligned opening 7 in the heating station housing 4 when the elevator is in the lower position (FIGS. 4, 5 and 7).

The cooling station 2 comprises a cold-air fan (not illustrated in more detail) with a slot-shaped cold-air nozzle 20. The cold-air nozzle 20 is aligned and arranged in such a way that the stream of cold air flowing through it is aligned symmetrically to a rotational-mold holder 14 arranged in the cooling station 2. Specifically, the cold-air nozzle 20 is aligned in such a way that the stream of cold air impinges the spherical rotational-mold holder 14 in an equatorial plane. In this way, it is advantageously ensured that the spherical rotational-mold holder 14 is not additionally driven in rotation by the stream of cold air.

The heating station 1 comprises a hot-air fan (not illustrated in more detail), which contains a slot-shaped hot-air nozzle 21. The hot-air nozzle 21 is aligned and arranged in such a way that the stream of hot air flowing through it is aligned symmetrically to a rotational-mold holder 14 arranged in the heating station 1. Specifically, the hot-air nozzle 21 is aligned in such a way that the stream of hot air impinges the spherical rotational-mold holder 14 in an equatorial plane. In this way, it is advantageously ensured that the spherical rotational-mold holder 14 is not additionally driven in rotation by the stream of hot air.

A temperature measuring device 24, which is in the form of a pyrometer 23 and by means of which the temperature of the rotational mold 16 can be measured, is present.

FIG. 7 shows the exemplary embodiment of the rotational-molding installation according to the disclosure in a situation in which the rotational-molding installation is ready to receive a spherical rotational-mold holder 14 with a rotational mold 16 held therein. The spherical rotational mold holder 14 can be brought into the receptacle 15 horizontally through a lateral opening (not illustrated further) in the cooling station housing 2.

Before inserting a rotational-mold holder 14 with a rotational mold 16 held therein into the receptacle 15, it is necessary to charge the rotational mold 16 with rotational-molding material 10. In the exemplary embodiment illustrated, the rotational mold 16 is designed to produce a plant pot. In terms of the type of object to be produced, however, there are no fundamental restrictions.

The spherical rotational-mold holder 14 consists of a first hemisphere 25 and a second hemisphere 26, which can be detachably connected to one another. The rotational mold 16 likewise has a two-part structure and has a first rotational-mold part 27 and a second rotational-mold part 28. The first rotational-mold part 27 is fastened to the inside of the first hemisphere 25 by means of first springs 29, whereas the second rotational-mold part 28 is fastened to the inside of the second hemisphere 26 by means of second springs 30. The first hemisphere 25 together with the first rotational-mold part 27 can be lifted off from the second hemisphere 26 together with the second rotational-mold part 28, in order to be able to introduce rotational-molding material 10 into the rotational mold 16 before a rotation operation and to be able to remove the produced product after a rotation operation.

After introducing the rotational-molding material 10, the first rotational-mold part 27 is fitted onto the second rotational-mold part 28 and thus closes the rotational-mold holder 16. Subsequently, the rotational-mold holder 14 with a rotational mold 16 held therein can be brought into the receptacle 15 of the rotational device 9 through a lateral opening in the cooling station 2.

FIG. 5 shows the exemplary embodiment of the rotational-molding installation after a spherical rotational-mold holder 14 together with a rotational mold 16 held therein has been introduced into the receptacle 15. Subsequently, the entire rotational device 9, together with the rotational-mold holder 14 located in the receptacle and the rotational mold 16, is transferred vertically upward into the heating station 1 by means of the elevator.

FIG. 6 shows the situation after the entire rotational device, together with the rotational-mold holder 14 and the rotational mold 16, has been brought vertically upward into the heating station 1 by means of the elevator.

In the heating station 1, the rotational mold 16 is heated by means of the hot-air fan. The rotational-mold holder 14 has a plurality of apertures through which the stream of hot air expelled by the hot-air nozzles 21 impinges the rotational mold 16. The rotational mold 16 is rotated and heated at the same time, in order that the previously introduced rotational-molding material 10 can melt and accumulate on the inner side of the rotational mold 16. In the process, the rotational-mold holder 14 is held in position whilst it rotates by means of the laterally arranged grinding plates 22. The rotational-mold holder 14 remains stationary within the heating station 1 during the rotation operation.

After all of the rotational-molding material 10 has accumulated on the inner wall of the rotational mold 16, the entire rotational device 9, together with the rotational-mold holder 14 located in the receptacle 15 and the rotational mold 16, is transferred vertically downward into the cooling station 2 by means of the elevator. In the process, the rotational-mold holder 14 together with the rotational mold 16 continues to be rotated.

FIG. 7 shows the situation after the entire rotational device, together with the rotational-mold holder 14 and the rotational mold 16, has been brought vertically downward back into the heating station 2 by means of the elevator.

In the cooling station 2, the rotational mold 16 is actively cooled by means of the cold-air fan, whilst the drive device uninterruptedly drives the spherical rotational-mold holder 14 in rotation.

As soon as the temperature measuring device 24 has established that the rotational mold 16 has cooled down enough, the spherical rotational-mold holder 14 together with the rotational mold 16 can be removed through the lateral opening (not illustrated) in the cooling station housing 3. The rotational-molding installation is then ready to receive a spherical rotational-mold holder 14, freshly charged with rotational-molding material 10, together with a rotational mold 16 held therein and to begin the depicted sequence anew.

FIG. 8 shows a further exemplary embodiment of a rotational-molding installation according to the disclosure, which comprises a heating station 1 and a cooling station 2. The heating station 1 is arranged vertically above the cooling station 2.

The cooling station 2 has a cooling station housing 3 and the heating station 1 has a heating station housing 4. The heating station housing 4 has a thermally insulating design. In particular, it may advantageously be provided that the heating station housing 4 has a double-walled design, it advantageously being possible to arrange a thermally insulating material, for example glass wool or foam glass or at least one vacuum insulation panel or another insulation material, between the walls.

A thermal insulation device 5 and an inwardly protruding brush seal 34 are arranged between the heating station housing 4 and the cooling station housing 3. The thermal insulation device 5 contains pointed spacers 6, via which the heating station 1 standing on the cooling station 2 is supported. The thermal insulation device 5 adjoins the four lower edges of the heating station housing 4 and the four upper edges of the cooling station housing 3 around the periphery. The thermal insulation device 5 reduces the transfer of heat from the heating station housing 4 to the cooling station housing 3.

The rotational-molding installation comprises a rotational device 9 with a rotary drive 11. The rotational drive 11 contains a first drive motor 12, which drives a drive wheel 13 in rotation about a horizontal axis. The drive wheel 13 is designed to be in frictional contact with the outer side of a rotational-mold holder 14 (not illustrated in this figure), which can be inserted into a receptacle 15 of the rotational device 9.

A spherical rotational-mold holder 14 holding a rotational mold 16 may be arranged and driven in rotation in the receptacle 15. This is illustrated in FIGS. 5, 6 and 7. The receptacle 15 comprises laterally arranged grinding plates 22, which hold a rotational-mold holder 14 in position during the rotation operation.

The drive wheel 13 together with the first drive motor 12 may be rotated about a vertical axis by means of a second drive motor 17, in order to be able to change the alignment of the horizontal axis of rotation about which the drive wheel 13 rotates. In the event of a change in alignment of the horizontal axis of rotation about which the drive wheel 13 rotates, the alignment of the axis of rotation about which the rotational mold 14 together with the rotational mold 16 held therein rotates also changes automatically.

The drive wheel 13 protrudes through a slot in a round plate 35, which is rotatably mounted and which is always rotated together with the drive wheel 13 about a vertical axis. The plate 35 is rotatably mounted in a frame plate 36.

The heating station housing 4 has a downwardly aligned opening 7 and the cooling station housing 3 has an upwardly aligned opening 8. The upper opening 8 in the cooling station housing 3 is in line with the downwardly aligned opening 7 of the heating station housing 4 such that the entire rotational device 9 together with a rotational-mold holder 14 located in the receptacle 15 can be transferred vertically from the cooling station 2 to the heating station 1 and, in reverse, from the heating station 1 back to the cooling station 2. To that end, an elevator with guide rails (not illustrated) is present. A platform 19 of the rotational device 9 is mounted displaceably in a motor-driven manner on the guide rails (not illustrated).

By bearing against the brush seal 34, the plate 35 and the frame plate 36 close the downwardly aligned opening 7 in the heating station housing 4 when the elevator is in the upper position, as shown in FIG. 10.

The platform 19 bears four vertical carriers 18, which for their part bear a thermally insulating cover plate 32, which is arranged parallel to the platform 19. By bearing against the brush seal 34, the cover plate 32 closes the downwardly aligned opening 7 in the heating station housing 4 when the elevator is in the lower position (FIGS. 8, 9 and 11).

The cooling station 2 comprises a cold-air fan (not illustrated in more detail) with a slot-shaped cold-air nozzle 20. The cold-air nozzle 20 is aligned and arranged in such a way that the stream of cold air flowing through it is aligned symmetrically to a rotational-mold holder 14 arranged in the cooling station 2. Specifically, the cold-air nozzle 20 is aligned in such a way that the stream of cold air impinges the spherical rotational-mold holder 14 in an equatorial plane. In this way, it is advantageously ensured that the spherical rotational-mold holder 14 is not additionally driven in rotation by the stream of cold air.

The heating station 1 comprises a hot-air fan (not illustrated in more detail), which contains a slot-shaped hot-air nozzle 21. The hot-air nozzle 21 is aligned and arranged in such a way that the stream of hot air flowing through it is aligned symmetrically to a rotational-mold holder 14 arranged in the heating station 1. Specifically, the hot-air nozzle 21 is aligned in such a way that the stream of hot air impinges the spherical rotational-mold holder 14 in an equatorial plane. In this way, it is advantageously ensured that the spherical rotational-mold holder 14 is not additionally driven in rotation by the stream of hot air.

A temperature measuring device 24, which is in the form of a pyrometer 23 and by means of which the temperature of the rotational mold 16 can be measured, is present. A tube of the pyrometer 23, through which the pyrometer receives radiation, protrudes through an opening in the frame plate 36.

FIG. 8 shows the exemplary embodiment of the rotational-molding installation according to the disclosure in a situation in which the rotational-molding installation is ready to receive a spherical rotational-mold holder 14 with a rotational mold 16 held therein. The spherical rotational mold holder 14 can be brought into the receptacle 15 horizontally through a lateral opening (not illustrated further) in the cooling station housing 2.

Before inserting a rotational-mold holder 14 with a rotational mold 16 held therein into the receptacle 15, it is necessary to charge the rotational mold 16 with rotational-molding material 10. In the exemplary embodiment illustrated, the rotational mold 16 is designed to produce a plant pot. In terms of the type of object to be produced, however, there are no fundamental restrictions.

The spherical rotational-mold holder 14 consists of a first hemisphere 25 and a second hemisphere 26, which can be detachably connected to one another. The rotational mold 16 likewise has a two-part structure and has a first rotational-mold part 27 and a second rotational-mold part 28. The first rotational-mold part 27 is fastened to the inside of the first hemisphere 25 by means of first springs 29, whereas the second rotational-mold part 28 is fastened to the inside of the second hemisphere 26 by means of second springs 30. The first hemisphere 25 together with the first rotational-mold part 27 can be lifted off from the second hemisphere 26 together with the second rotational-mold part 28, in order to be able to introduce rotational-molding material 10 into the rotational mold 16 before a rotation operation and to be able to remove the produced product after a rotation operation.

After introducing the rotational-molding material 10, the first rotational-mold part 27 is fitted onto the second rotational-mold part 28 and thus closes the rotational-mold holder 16. Subsequently, the rotational-mold holder 14 with a rotational mold 16 held therein can be brought into the receptacle 15 of the rotational device 9 through a lateral opening in the cooling station 2.

FIG. 9 shows the exemplary embodiment of the rotational-molding installation after a spherical rotational-mold holder 14 together with a rotational mold 16 held therein has been introduced into the receptacle 15. Subsequently, the entire rotational device 9, together with the rotational-mold holder 14 located in the receptacle and the rotational mold 16, is transferred vertically upward into the heating station 1 by means of the elevator.

FIG. 10 shows the situation after the entire rotational device, together with the rotational-mold holder 14 and the rotational mold 16, has been brought vertically upward into the heating station 1 by means of the elevator.

In the heating station 1, the rotational mold 16 is heated by means of the hot-air fan. The rotational-mold holder 14 has a plurality of apertures through which the stream of hot air expelled by the hot-air nozzles 21 impinges the rotational mold 16. The rotational mold 16 is rotated and heated at the same time, in order that the previously introduced rotational-molding material 10 can melt and accumulate on the inner side of the rotational mold 16. In the process, the rotational-mold holder 14 is held in position whilst it rotates by means of the laterally arranged grinding plates 22. The rotational-mold holder 14 remains stationary within the heating station 1 during the rotation operation.

After all of the rotational-molding material 10 has accumulated on the inner wall of the rotational mold 16, the entire rotational device 9, together with the rotational-mold holder 14 located in the receptacle 15 and the rotational mold 16, is transferred vertically downward into the cooling station 2 by means of the elevator. In the process, the rotational-mold holder 14 together with the rotational mold 16 continues to be rotated.

FIG. 11 shows the situation after the entire rotational device, together with the rotational-mold holder 14 and the rotational mold 16, has been brought vertically downward back into the heating station 2 by means of the elevator.

In the cooling station 2, the rotational mold 16 is actively cooled by means of the cold-air fan, whilst the drive device uninterruptedly drives the spherical rotational-mold holder 14 in rotation.

As soon as the temperature measuring device 24 has established that the rotational mold 16 has cooled down enough, the spherical rotational-mold holder 14 together with the rotational mold 16 can be removed through the lateral opening (not illustrated) in the cooling station housing 3. The rotational-molding installation is then ready to receive a spherical rotational-mold holder 14, freshly charged with rotational-molding material 10, together with a rotational mold 16 held therein and to begin the depicted sequence anew.

The exemplary embodiment illustrated in FIGS. 7 to 11 has the particular advantage that the rotary drive 11 (except for a small part of the drive wheel 13 protruding through the plate 35) always remains outside of the heating station 1. As a result, the rotary drive 11 is not conjointly heated, thereby conserving the rotary drive 11 and contributing to a saving on energy.

LIST OF REFERENCE SIGNS

1 Rotational-mold holder
2 Rotational mold
3 First hemisphere
4 Second hemisphere
5 First rotational molding
6 Second rotational molding
7 First springs
8 Second springs
9 Rotational-molding material
10 Drive device
11 Drive motor
12 Drive wheel
13 Further drive device
14 Second drive motor
15 Grinding plate
16 Input device
17 Display device
18 Input unit
19 Control device
20 Trajectory segment type
21 Timeline
22 Trajectory segment
23 Trajectory segment
24 Trajectory segment
25 Trajectory
26 Preview display
27 Computer mouse
28 Reference point
29 Selection display

What is claimed is:

1. A method for operating a rotational-molding device, the rotational-molding device comprising a rotatably mounted rotational-mold holder with a rotational mold, wherein the rotational-mold holder or the rotational mold includes a reference point thereon, the method comprising the steps of:
   providing, by a control device, a set of multiple possible predefined trajectories of the reference point that the reference point can follow in a rotation operation, wherein each trajectory of the set of multiple possible predefined trajectories has a trajectory-specific starting point of the reference point;
   receiving, by the control device, a selected trajectory chosen by a user from the set of multiple possible predefined trajectories for the rotation operation;
   rotating the rotational mold holder or rotational mold under control of the control device to an initial rotational orientation prior to commencing the rotation operation such that the reference point assumes the trajectory-specific starting point associated with the selected trajectory; and
   subsequently performing the rotation operation under control of the control device, wherein during the rotation operation the rotational mold holder or rotational mold is rotated such that the reference point moves along the selected trajectory starting from the trajectory-specific starting point associated with the selected trajectory and rotational-molding material in the rotational mold accumulates on an inner side of the rotational mold.

2. The method as claimed in claim 1, wherein the selected trajectory is selected depending on the design of the rotational mold.

3. The method as claimed in claim 1, wherein the selected trajectory is configured such that at least one location on the inner side of the rotational mold remains free of rotational-molding material during the rotation operation.

4. The method as claimed in claim 1, wherein the selected trajectory is configured such that at least one location on the inner side of the rotational mold is never arranged at a bottom of the rotational mold during the rotation operation.

5. The method as claimed in claim 1, wherein the selected trajectory is configured such that at least one location on the inner side of the rotational mold is arranged at a bottom of the rotational mold more often than all other locations on the inner side of the rotational mold during the rotation operation.

6. The method as claimed in claim 1, wherein the selected trajectory is configured such that, during the rotation operation, an especially large amount of rotational-molding material accumulates at least at one location on the inner side of the rotational mold.

7. The method as claimed in claim 1, wherein at least one trajectory from the set of multiple possible predefined trajectories was inputted via an interface of the rotational-molding device.

8. The method as claimed in claim 7, wherein the at least one trajectory is defined by inputting trajectory segments and joining together the trajectory segments that were input.

9. The method as claimed in claim 8, wherein each inputted trajectory segment is assigned a speed at which the reference point moves along the trajectory segment during the rotation operation, or wherein each inputted trajectory segment is assigned a speed variation over time with which the reference point moves along the trajectory segment during the rotation operation.

10. The method as claimed in claim 8, wherein the inputting of a trajectory segment comprises the input of at least one parameter from the following group: trajectory segment length, trajectory segment curvature, trajectory segment curvature profile.

11. The method as claimed in claim 8, wherein inputted trajectory segments directly following one another differ from one another in length and/or curvature and/or curvature profile and/or an assigned speed and/or an assigned speed variation.

12. The method as claimed in claim 8, wherein the inputting of at least one of the trajectory segments comprises making a selection from a selection display of different trajectory segment types.

13. The method as claimed in claim 12, wherein the trajectory segment types in the selection display are each depicted in a perspective depiction.

14. The method as claimed in claim 12, wherein the trajectory segment types in the selection display are each depicted as a projection onto a planar surface.

15. The method as claimed in claim 14, wherein the projection is a stereoscopic projection or a parallel projection or a Mercator projection.

16. The method as claimed in claim 14, wherein the selection display comprises at least one trajectory segment type the projection of which is a projection from the following group: segment of a circle, segment of a parabola, segment of a straight line, 90 degree arc, 180 degree arc, 270 degree arc, 360 degree arc, segment of a loop, projection of an involute of a circle onto a spherical surface, segment of a spiral, stop segment.

17. The method as claimed in claim 1, wherein the reference point is selected such that the trajectory runs exclusively on one spherical surface.

18. The method as claimed in claim 1, wherein the selected trajectory is displayed in a projection onto a two-dimensional plane.

19. The method as claimed in claim 18, wherein the projection is a parallel projection or a stereographic projection or a Mercator projection.

20. The method as claimed in claim 1, wherein the rotational-molding device is a spherical rotational device.

21. The method as claimed in claim 1, wherein a temporal sequence of control signals for at least one drive motor generating the rotation is created from the profile of the selected trajectory.

22. The method as claimed in claim 1, wherein the rotational-mold holder is in the form of a sphere, which is driven in rotation during the rotation operation.

23. The method as claimed in claim 22, wherein the rotational-mold holder is driven by means of a drive wheel, which rolls on a surface of the sphere.

24. A rotational-molding device comprising:
a rotatably mounted rotational-mold holder with a rotational mold, wherein the rotational-mold holder or the rotational mold includes a reference point thereon; and
a control device operable to control rotation of the rotational-mold holder and the rotational mold in a rotation operation during which rotational-molding material introduced into the rotational mold accumulates on an inner side of the rotational mold;
wherein the control device provides a set of multiple possible predefined trajectories of the reference point that the reference point can follow in the rotation operation, wherein each trajectory of the set of multiple possible predefined trajectories has a trajectory-specific starting point of the reference point, wherein a user can choose a selected trajectory for the rotation operation from the set of multiple possible predefined trajectories;
wherein the control device rotates the rotational mold holder or rotational mold to an initial rotational orientation prior to commencing the rotation operation such that the reference point assumes the trajectory-specific starting point associated with the selected trajectory; and
wherein the control device subsequently controls the rotation operation such that the reference point moves along the selected trajectory starting from the trajectory-specific starting point associated with the selected trajectory.

25. The rotational-molding device as claimed in claim 24, wherein the set of multiple possible trajectories consists exclusively of trajectories in which at least one location on the inner side of the rotational mold remains free of rotational-molding material during the rotation operation.

26. The rotational-molding device as claimed in claim 24, wherein the set of multiple possible trajectories consists exclusively of trajectories in which at least one location on the inner side of the rotational mold is never arranged at a bottom of the rotational mold during the rotation operation.

27. The rotational-molding device as claimed in claim 24, wherein the set of multiple possible trajectories consists exclusively of trajectories in which at least one location on the inner side of the rotational mold is arranged at a bottom of the rotational mold more often than all other locations during the rotation operation.

28. The rotational-molding device as claimed in claim 24, wherein the set of multiple possible trajectories consists exclusively of trajectories in which, during the rotation operation, an amount of rotational-molding material accumulates at least at one location on the inner side of the rotational mold.

29. The rotational-molding device as claimed in claim 24, wherein the rotational-molding device further comprises an interface configured to receive at least one inputted trajectory that the reference point can follow in the rotation operation and add the at least one inputted trajectory to the set of multiple possible trajectories.

30. The rotational-molding device as claimed in claim 24, wherein the control device is configured to establish a trajectory that the reference point can follow in the rotation operation from a plurality of inputted trajectory segments by stringing together the plurality of inputted trajectory segments.

31. The rotational-molding device as claimed in claim 30, further comprising an input device for inputting the plurality of trajectory segments.

32. The rotational-molding device as claimed in claim 31, wherein the input device comprises a display device, which displays a selection display of different trajectory segment types from which trajectory segments can be selected by means of an input unit.

33. The rotational-molding device as claimed in claim 32, wherein the display device depicts each of the trajectory segment types in the selection display in a perspective depiction.

34. The rotational-molding device as claimed in claim 32, wherein the display device depicts each of the trajectory segment types in the selection display as a projection onto a planar surface.

35. The rotational-molding device as claimed in claim 34, wherein the projection is a stereoscopic projection or a parallel projection or a Mercator projection.

36. The rotational-molding device as claimed in claim 34, wherein the selection display comprises at least one trajectory segment type the projection of which is a projection from the following group: segment of a circle, segment of a parabola, segment of a straight line, 90 degree arc, 180 degree arc, 270 degree arc, 360 degree arc, segment of a loop, projection of an involute of a circle onto a spherical surface, segment of a spiral, stop segment.

37. The rotational-molding device as claimed in claim 30, wherein
a. for each of the plurality of inputted trajectory segments, a speed at which the reference point moves along the trajectory segment during a rotation operation can be input, which speed is assigned to the trajectory segment by the control device, or
b. for each of the plurality of inputted trajectory segments, a speed variation with which the reference point moves along the trajectory segment during a rotation operation can be input, which speed variation is assigned to the trajectory segment by the control device.

38. The rotational-molding device as claimed in claim 30, wherein the inputting of a trajectory segment comprises the input of at least one parameter from the following group: trajectory segment length, trajectory segment curvature, trajectory segment curvature profile.

39. The rotational-molding device as claimed in claim 24, further comprising a display device, wherein the selected trajectory is displayed by the display device in a projection onto a two-dimensional plane.

40. The rotational-molding device as claimed in claim 39, wherein the projection is a parallel projection or a stereographic projection or a Mercator projection.

41. The rotational-molding device as claimed in claim 24, wherein the rotational-molding device is a spherical rotational device.

42. The rotational-molding device as claimed in claim 24, wherein, from a profile of the selected trajectory, the control device creates a temporal sequence of control signals for at least one drive motor generating the rotation of the rotational-mold holder and the rotational mold in the rotation operation.

43. The rotational-molding device as claimed in claim 24, wherein the rotational-mold holder is in the form of a sphere, which is driven in rotation during the rotation operation.

44. The rotational-molding device as claimed in claim 43, wherein the rotational-mold holder is driven by means of a drive wheel, which rotates about a first axis of rotation and which rolls on the surface of the sphere.

45. The rotational-molding device as claimed in claim 44, wherein the drive wheel is mounted so as to be able to rotate about a second axis of rotation which is perpendicular to the first axis of rotation.

46. The rotational-molding device as claimed in claim 44, further comprising one or more sensors arranged and configured to sense rotational alignment information representing a current rotational alignment of the rotational-mold holder and transmit the rotational alignment information to the control device, wherein the one or more sensors transmit rotational alignment information corresponding to the initial rotational orientation to the control device when the rotational mold holder or rotational mold has been rotated to the initial rotational orientation prior to commencing the rotation operation.

* * * * *